US010191403B2

(12) United States Patent
Omura et al.

(10) Patent No.: US 10,191,403 B2
(45) Date of Patent: Jan. 29, 2019

(54) IMAGE FORMING APPARATUS

(71) Applicant: CANON KABUSHIKI KAISHA, Tokyo (JP)

(72) Inventors: Naoka Omura, Matsudo (JP); Koichi Taniguchi, Tokyo (JP); Daisuke Aruga, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/801,033

(22) Filed: Nov. 1, 2017

(65) Prior Publication Data

US 2018/0143559 A1 May 24, 2018

(30) Foreign Application Priority Data

Nov. 18, 2016 (JP) ................................ 2016-225040

(51) Int. Cl.
*G03G 15/01* (2006.01)
*G03G 15/04* (2006.01)
(Continued)

(52) U.S. Cl.
CPC ..... *G03G 15/0189* (2013.01); *G03G 15/0409* (2013.01); *G03G 15/04072* (2013.01);
(Continued)

(58) Field of Classification Search
CPC ......... G03G 15/0189; G03G 15/04072; G03G 15/5045; G03G 15/1615; G03G 2215/0158; G06K 15/1878

See application file for complete search history.

(56) References Cited

U.S. PATENT DOCUMENTS 9,229,355 B2   1/2016   Nito ..................... G03G 15/043
9,310,711 B2   4/2016   Ohta et al. ........... G03G 15/043
(Continued)

FOREIGN PATENT DOCUMENTS

JP   2006-011289   1/2006
JP   2015-049397   3/2015
(Continued)

OTHER PUBLICATIONS

U.S. Appl. No. 15/702,219, filed Sep. 12, 2017.
(Continued)

*Primary Examiner* — Gregory H Curran
(74) *Attorney, Agent, or Firm* — Venable LLC

(57) ABSTRACT

An image forming apparatus including a controller, which starts rotation of a rotary polygon mirror when a predetermined condition is satisfied, rotates the rotary polygon mirror at a predetermined rotation speed based on a first pulse in a first state in which light beams are not emitted from a light source, thereafter starts emission of the light beams, switches a rotation control based on the first pulse to a rotation control based on the second pulse, and rotates the rotary polygon mirror at the predetermined rotation speed based on the second pulse in a second state in which the light beams are emitted from the light source, and thereafter detects a temperature of a drive circuit board by a temperature detector, and corrects color misregistration using a detected temperature of the temperature detector and the detection result of a pattern detector.

14 Claims, 16 Drawing Sheets

(51) Int. Cl.
  *G03G 15/00* (2006.01)
  *G03G 15/16* (2006.01)
  *G03G 15/18* (2006.01)
  *G06K 15/00* (2006.01)
  *G06K 15/02* (2006.01)
  *G03G 21/20* (2006.01)

(52) U.S. Cl.
  CPC ..... *G03G 15/5045* (2013.01); *G03G 15/5058* (2013.01); *G06K 15/1878* (2013.01); *G03G 15/1615* (2013.01); *G03G 21/20* (2013.01); *G03G 2215/0158* (2013.01)

(56) References Cited

U.S. PATENT DOCUMENTS

| | | | |
|---|---|---|---|
| 9,493,014 B2 | 11/2016 | Aruga et al. | B41J 2/47 |
| 9,696,673 B2 | 7/2017 | Omura et al. | G03G 15/5058 |
| 9,851,655 B2 * | 12/2017 | Sato | G03G 15/043 |
| 2002/0190666 A1 * | 12/2002 | Sakamoto | H01S 5/06804 |
| | | | 315/291 |
| 2015/0117912 A1 * | 4/2015 | Kamiyama | G03G 15/0131 |
| | | | 399/301 |

FOREIGN PATENT DOCUMENTS

| | | |
|---|---|---|
| JP | 2015-194613 | 11/2015 |
| JP | 2015-197667 | 11/2015 |

OTHER PUBLICATIONS

Office Action dated Oct. 2, 2018 in counterpart Japan Application No. 2016-225040, together with English translation thereof.

* cited by examiner

IMAGE FORMING APPARATUS

BACKGROUND OF THE INVENTION

Field of the Invention

The present invention relates to an image forming apparatus with a color misregistration correction unit.

Description of the Related Art

For an electrophotographic color image forming apparatus, various types of schemes have been proposed that include a plurality of image forming portions for achieving high speed and sequentially transfer different color images onto a recording material held on a conveyance belt. These schemes cause a problem in that heat generation from a deflector in a light scanning apparatus causes deformations and changes in positions and attitudes of optical components, such as lenses and reflecting mirrors, changes the positions irradiated with light beams, causes positions where images with respective colors are overlaid not to coincide with each other, and causes color misregistration. To address this problem, a technique has been known that forms a color misregistration detection pattern on a transfer belt at a predetermined timing, reads the color misregistration detection pattern through the pattern sensor to detect the color misregistration amount, and controls the writing start timing according to the detected color misregistration amount, thereby correcting the color misregistration.

However, the correction technique as described above requires formation of the color misregistration detection pattern for every appropriate time interval or for every appropriate number of prints. This requirement increases the downtime. To address this problem, a technique has been proposed that preliminarily stores the relationship of correspondence between the temperature in the apparatus and the color misregistration amount, and predicts the color misregistration amount from the temperature in the apparatus based on the stored relationship of correspondence, thereby correcting the color misregistration without forming the color misregistration detection pattern. Japanese Patent Application Laid-Open No. 2006-11289 discloses a technique that predicts the amount of positional misregistration in the sub-scanning direction where photosensitive drums are irradiated with respective light beams, according to the temperature detected by a temperature sensor provided in a housing of a light scanning apparatus, and corrects the timing of scanning one line according to the predicted amount.

However, since in Japanese Patent Application Laid-Open No. 2006-11289, the temperature sensor is disposed at the center of the housing to remove the adverse effect of internal air flows in the housing on the temperature sensor, the temperature rise amount detected by the temperature sensor is lower than the temperature rise amount adjacent to a deflector (heat source). Consequently, the color misregistration amount obtained from the temperature rise amount detected by the temperature sensor cannot follow the actual color misregistration amount due to temperature rise, and causes the color misregistration.

It can be considered to provide a temperature detector outside of the housing to avoid adverse effects on the temperature detector due to internal air flows in the housing. A drive circuit board that drives a light source is provided outside of the housing. The drive circuit board supplies current to the light source to thereby increase the temperature. The temperature rise amount tends to be the same as the temperature rise amount of the internal temperature of the housing. It can be considered to provide a temperature detection unit on the drive circuit board outside of the housing, instead of providing the temperature detection unit in the housing. However, on the other hand, to reduce the time from reception of an image formation start signal to forming an image on a recording medium and ejecting the medium, as much as possible, control is performed that starts rotation of a rotary polygon mirror at early timing to achieve stationary rotation in an early stage. In the case of achieving stationary rotation of the rotary polygon mirror in an early stage, the rotation of the rotary polygon mirror is sometimes controlled without turning on the light source. In this case, if the time from starting the rotation of the rotary polygon mirror to reception of the image formation start signal is long, the time of rotating the rotary polygon mirror without turning on the light source is long accordingly. The temperature rise amount of the drive circuit board outside of the housing becomes smaller than the temperature rise amount of the internal temperature of the housing. Consequently, if a correction value is calculated and the color misregistration is corrected based on the temperature detected by the temperature detector on the drive circuit board outside of the housing, the color misregistration cannot be correctly corrected.

SUMMARY OF THE INVENTION

The present invention provides an image forming apparatus which corrects color misregistration based on a temperature detected by a temperature detector disposed on a drive circuit board provided outside of a housing of a light scanning apparatus.

To solve the problem described above, an image forming apparatus according to an embodiment of the present invention comprises:
  a plurality of photosensitive members;
  a light scanning apparatus configured to emit light beams scanning on surfaces of the plurality of photosensitive members, respectively, to form electrostatic latent images on the surfaces of the plurality of photosensitive members;
  a plurality of developing devices configured to develop the electrostatic latent images formed on the surfaces of the plurality of photosensitive members with developers having respective colors to form a plurality of toner images;
  an intermediate transfer member on which the plurality of toner images developed by the plurality of developing devices are transferred;
  a pattern detector configured to detect a registration correction pattern included in the toner images transferred onto the intermediate transfer member; and a controller configured to correct a color misregistration between toner images having respective colors on the intermediate transfer member, based on a detection result of the pattern detector,
  wherein the light scanning apparatus includes:
    a light source configured to emit the light beams;
    a rotary polygon mirror configured to deflect the light beams emitted from the light source so that the light beams scan on the surfaces of the plurality of photosensitive members, respectively, to form the electrostatic latent images;
    a motor configured to rotate the rotary polygon mirror;

a first pulse generation unit configured to generate a first pulse in synchronization with a rotation speed of the motor;

a second pulse generation unit configured to generate a second pulse by receiving a light beam deflected by the rotary polygon mirror;

a drive circuit board, to which the light source is attached, configured to drive the light source according to image data;

a housing configured to hold the rotary polygon mirror and the motor therein; and a temperature detector, disposed on the drive circuit board provided outside of the housing, configured to detect a temperature of the drive circuit board, and wherein the controller starts rotation of the rotary polygon mirror when a predetermined condition is satisfied in a state in which the rotary polygon mirror is stopped, and rotates the rotary polygon mirror at a predetermined rotation speed based on the first pulse in a first state in which the light beams are not emitted from the light source, thereafter, starts emission of the light beams from the light source, switches a rotation control based on the first pulse to a rotation control based on the second pulse, and rotates the rotary polygon mirror at the predetermined rotation speed based on the second pulse in a second state in which the light beams are emitted from the light source, and thereafter, detects a temperature of the drive circuit board by the temperature detector in response to input of an image formation start signal for starting image formation, and corrects color misregistration using a detected temperature of the temperature detector and the detection result of the pattern detector.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

(Image Forming Apparatus)

Figure 1:
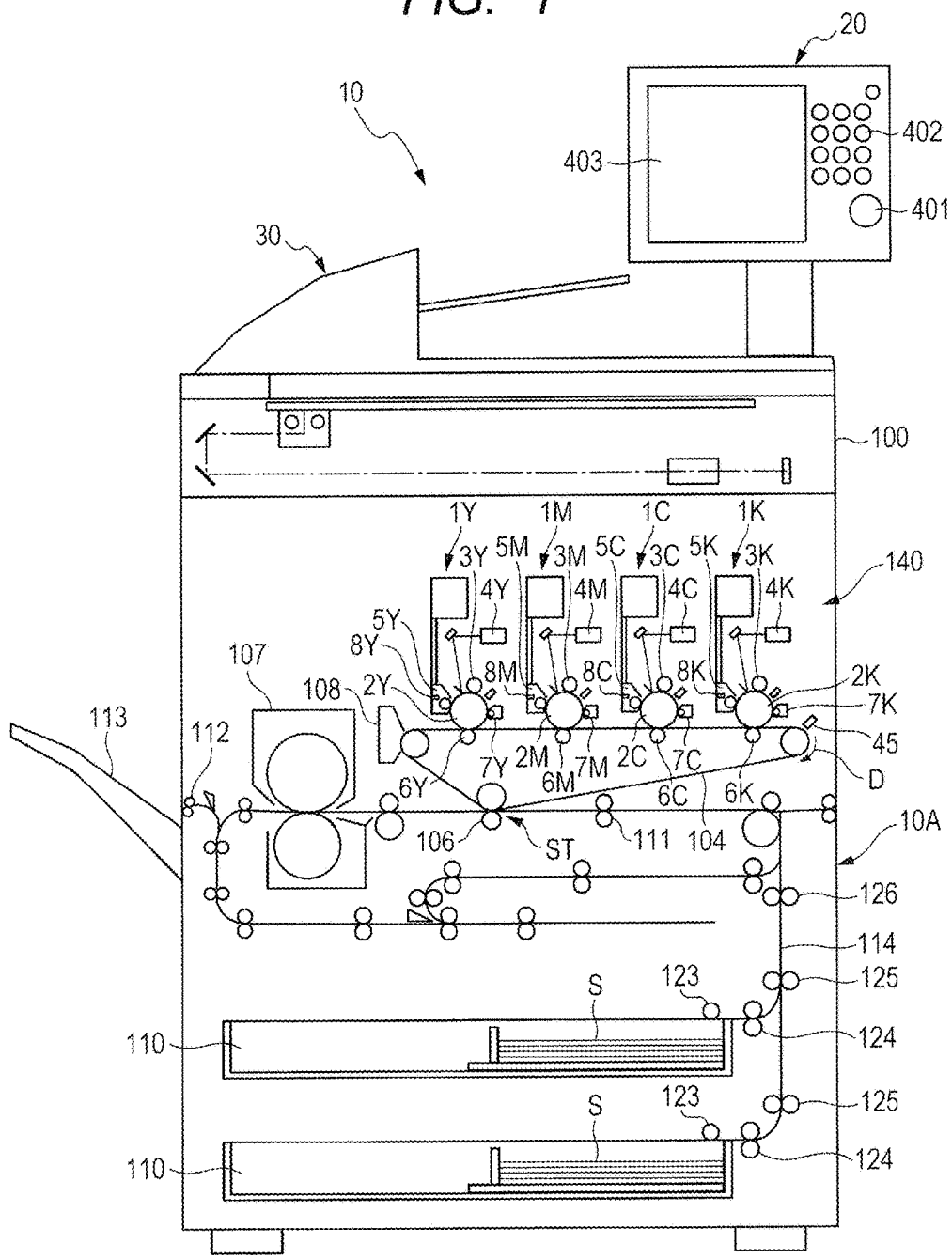
FIG. 1 is a sectional view of an image forming apparatus.

Hereinafter, referring to the accompanying drawings, an image forming apparatus according to an embodiment will be described. FIG. 1 is a sectional view of an image forming apparatus 10. The image forming apparatus 10 is a digital full color copier that forms an image on a recording medium using an electrophotographic image forming process. However, the image forming apparatus 10 of the present invention is not limited thereto. The image forming apparatus 10 may be, for example, a color laser beam printer, MFP (multi-functional printer), a facsimile machine, or a printer.

An operating portion 20 where a user sets an image forming condition, an automatic original feeding portion 30 and an image reading portion 100 are provided at upper parts of the image forming apparatus 10. The operating portion 20 accepts an input that is from the user and contains a reading start input for causing the image reading portion 100 to start reading an original. The automatic original feeding portion 30 supplies the original to the image reading portion 100 that serves as a reading device. The image forming apparatus 10 includes four image forming portions 1 (1Y, 1M, 1C and 1K). The image forming portion (first image forming portion) 1Y forms a yellow image using yellow toner. The image forming portion (second image forming portion) 1M forms a magenta image using magenta toner. The image forming portion 1C forms a cyan image using cyan toner. The image forming portion 1K forms a black image using black toner. The four image forming portions 1 have the same structure except the color of developer (toner). Consequently, except specifically required cases, the added indices Y, M, C and K are omitted from the reference symbols.

The image forming portions 1 include photosensitive drums (image bearing members) 2 as multiple photosensitive members. A charging device 3, a light scanning apparatus 4, a developing device 5, a primary transfer device 6 and a drum cleaning device 7 are disposed around the photosensitive drum 2. In each of the developing devices 5, a thermistor 8 as a temperature detector that detects the temperature in the corresponding developing device 5 is provided. Below the photosensitive drums 2, a transfer device is disposed that includes an endless intermediate transfer belt (hereinafter called an intermediate transfer member) 104. The transfer device transfers the toner images transferred on the intermediate transfer member 104 onto a sheet S. The intermediate transfer member 104 rotates in a direction indicated by an arrow D in FIG. 1 during image formation. A primary transfer device 6 is disposed toward the photosensitive drum 2 via the intermediate transfer member 104. A secondary transfer roller 106 is disposed to face the intermediate transfer member 104. In this embodiment, the image forming portion 1, the intermediate transfer member 104 and the secondary transfer roller 106 constitute an image forming unit 140 that forms an image on a paper sheet. Alternatively, the image forming unit may be configured so as to include neither the intermediate transfer member 104 nor the secondary transfer roller 106 and to transfer the toner image directly from the image forming portion 1 onto the paper sheet.

At lower positions in the image forming apparatus 10, supply cassettes (hereinafter called sheet storing portions) 110 that store sheets S, such as paper sheets, serving as recording media, are provided. In this embodiment, two sheet storing portions 110 are drawably attached into a main body 10A of the image forming apparatus 10.

(Image Forming Process)

Next, an image forming process of the image forming apparatus 10 will be described. The image forming processes in the four image forming portions 1 are the same. Accordingly, the image forming process in the yellow image forming portion 1Y will be described. The description of the image forming processes in the magenta image forming portion 1M, the cyan image forming portion 1C and the black image forming portion 1K is omitted.

The charging device 3Y uniformly charges the surface of the photosensitive drum 2Y. A yellow component of an image data generated by the image reading portion 100 reading the original or an image data generated by executing a job input from the operating portion 20 or a PC (not shown) is input into the light scanning apparatus 4Y. Likewise, a magenta component, a cyan component and a black component of the image data are input into the respective light scanning apparatuses 4M, 4C and 4K. The light scanning apparatus 4Y emits laser light (hereinafter called a light beam) to the uniformly charged surface of the photosensitive drum 2Y, based on the yellow component of the image data, and forms an electrostatic latent image on the photosensitive drum 2Y. The developing device 5Y develops the electrostatic latent image on the photosensitive drum 2Y using the yellow toner (developer) to obtain a yellow toner image. The primary transfer device 6Y primarily transfers the yellow toner image on the photosensitive drum 2Y, onto the intermediate transfer member 104. The toner remaining on the photosensitive drum 2Y after the primary transfer is removed by the drum cleaning device 7Y, and the photosensitive drum 2Y is prepared for the next image formation.

Likewise, the image forming portions 1M, 1C and 1K form toner images having the corresponding colors on the respective photosensitive drums 2M, 2C and 2K. The photosensitive drums 2Y, 2M, 2C and 2K are disposed at predetermined intervals. The corresponding toner images formed on the respective photosensitive drums 2Y, 2M, 2C and 2K are primarily transferred onto the intermediate transfer member 104 at predetermined timings. That is, the magenta toner image formed by the magenta image forming portion 1M is transferred onto the yellow toner image on the intermediate transfer member 104 in an accurately overlaid manner. Hereinafter, the cyan toner image and the black toner image are transferred onto the magenta toner image on the intermediate transfer member 104 in a sequentially overlaid manner. As a result, the four-color toner images are overlaid on the intermediate transfer member 104.

Meanwhile, the sheet S in the sheet storing portion 110 is conveyed by conveyance rollers 123, 124, 125 and 126 to registration rollers 111 through a conveyance path 114. The distal end of the sheet S comes into contact with the registration rollers 111 in a stop state, thereby correcting the oblique travel of the sheet S. After the distal end of the sheet S reaches the registration rollers 111, the registration rollers 111 are rotated at a predetermined timing to convey the sheet S to a secondary transfer portion ST between the intermediate transfer member 104 and the secondary transfer roller 106. The toner images primarily transferred on the intermediate transfer member 104 are secondarily transferred onto the sheet S at the secondary transfer portion ST. When the toner images on the intermediate transfer member 104 is secondarily transferred onto the sheet S at the secondary transfer portion ST, the toner sometimes remains on the intermediate transfer member 104. The toner remaining on the intermediate transfer member 104 is removed by an intermediate transfer member cleaning portion 108. The sheet S on which the toner images have been transferred is conveyed to a fixing portion 107. The fixing portion 107 heats and pressurizes the toner images transferred on the sheet S to fix the toner images on the sheet S and form a color image. The sheet S, on which the color image is formed, is ejected by ejection rollers 112 to an ejection portion 113 outside of the image forming apparatus 10.

(Light Scanning Apparatus)

Figure 2A:
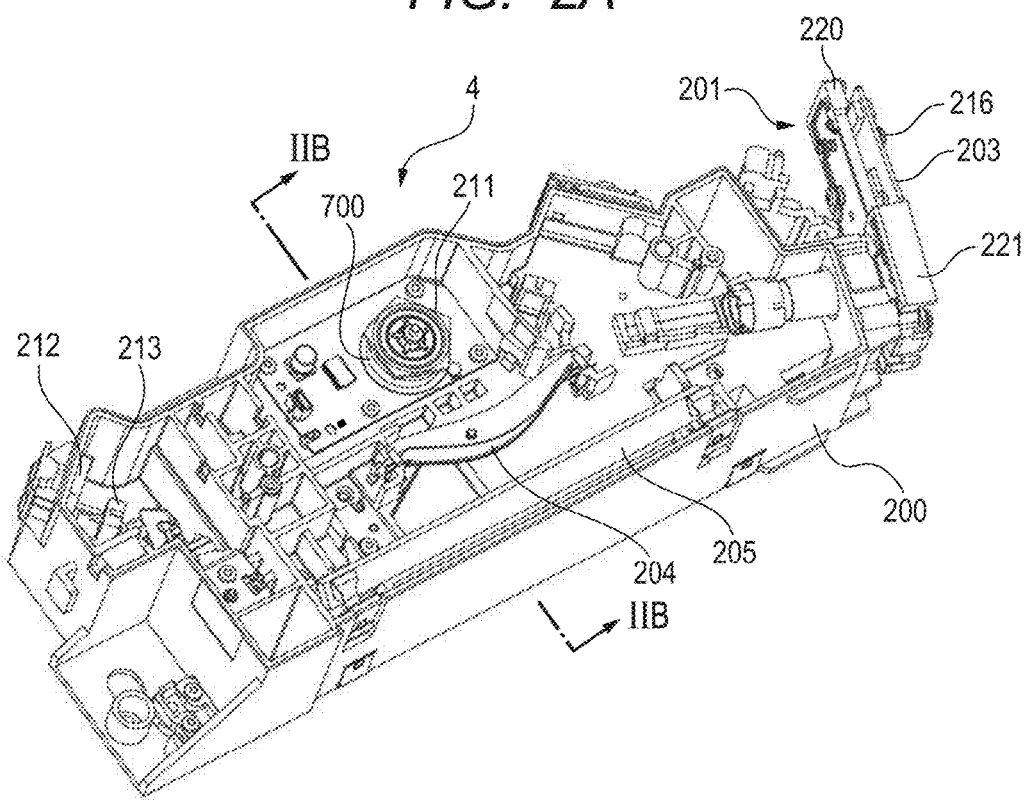
FIGS. 2A and 2B are diagrams illustrating a light scanning apparatus.
Figure 2B:
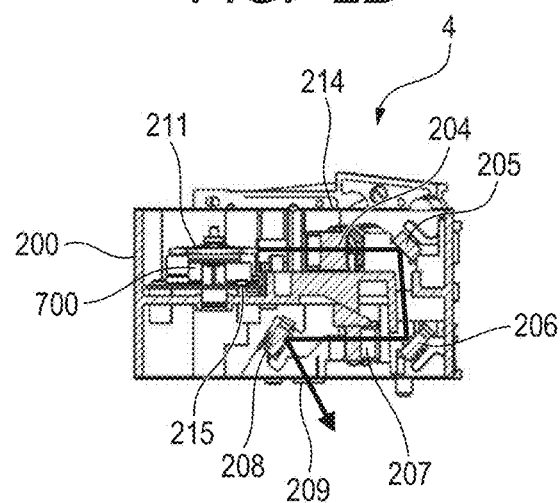

The light scanning apparatus 4 will hereinafter be described. FIGS. 2A and 2B are diagrams illustrating the light scanning apparatus 4. FIG. 2A is a perspective view of the light scanning apparatus 4 from which a cover 214 has been taken away. FIG. 2B is a sectional view of the light scanning apparatus 4 taken along line IIB-IIB of FIG. 2A. The light scanning apparatuses 4Y, 4M, 4C and 4K have analogous structures. The light scanning apparatus 4 includes an optical box (hereinafter called a housing) 200 to which an optical unit 201 is attached. The optical unit 201 includes a laser diode (hereinafter called a light source) 250 that emits a light beam, a drive circuit board 203 that drives the light source 250, and a thermistor 216 (FIG. 3B) serving as a temperature detector that detects the temperature of the drive circuit board 203. The thermistor 216 as the temperature sensor for detecting the temperature may be mounted on the drive circuit board (laser drive circuit board) 203 of the light scanning apparatus (second light scanning apparatus) 4M. The drive circuit board 203 is held by a holding member (laser holder) 220 that holds the drive circuit board 203. The light source 250 and a drive portion (laser driver) 230 that supplies the light source 250 with current (drive current) $I_{LD}$ are mounted on the drive circuit board 203. The drive circuit board 203 is provided outside of the housing 200 that is an outer frame of the light scanning apparatus 4. The drive circuit board 203 controls the current $I_{LD}$ that is to be supplied to the light source 250, according to the image data, thereby causing the light source 250 to emit a light beam modulated according to the image data. The housing 200 internally holds a rotary polygon mirror 211 serving as a deflection member (deflection portion) that deflects the light beam so that the surface of the photosensitive drum 2 can be scanned with the light beam emitted from the light source 250 in the main scanning direction. The rotary polygon mirror 211 is rotated by a drive motor 700. Optical members guide the light beam deflected by the rotary polygon mirror 211 onto the photosensitive drum 2. The housing 200 internally houses the rotary polygon mirror 211, the drive motor 700 and the optical members. The drive circuit board 203 is attached to the outer portion of the housing 200.

The housing 200 internally holds optical units, such as a first fθ lens 204, a reflecting mirror 205, a reflecting mirror 206, a second fθ lens 207 and a reflecting mirror 208. The light beam deflected by the rotary polygon mirror 211 enters the first fθ lens 204. The light beam having passed through the first fθ lens 204 is reflected by the reflecting mirrors 205 and 206 and enters the second fθ lens 207. The light beam having passed through the second fθ lens 207 is reflected by the reflecting mirror 208, passes through dustproof glass plate 209, and is guided to the photosensitive drum 2. The light beam with which scanning is performed by the rotary polygon mirror 211 at a uniform angular velocity is imaged on the surface of the photosensitive drum 2 by the first fθ lens 204 and the second fθ lens 207, and the surface of the photosensitive drum 2 is scanned with this beam at a uniform velocity.

(Optical Unit)

Figure 3A:
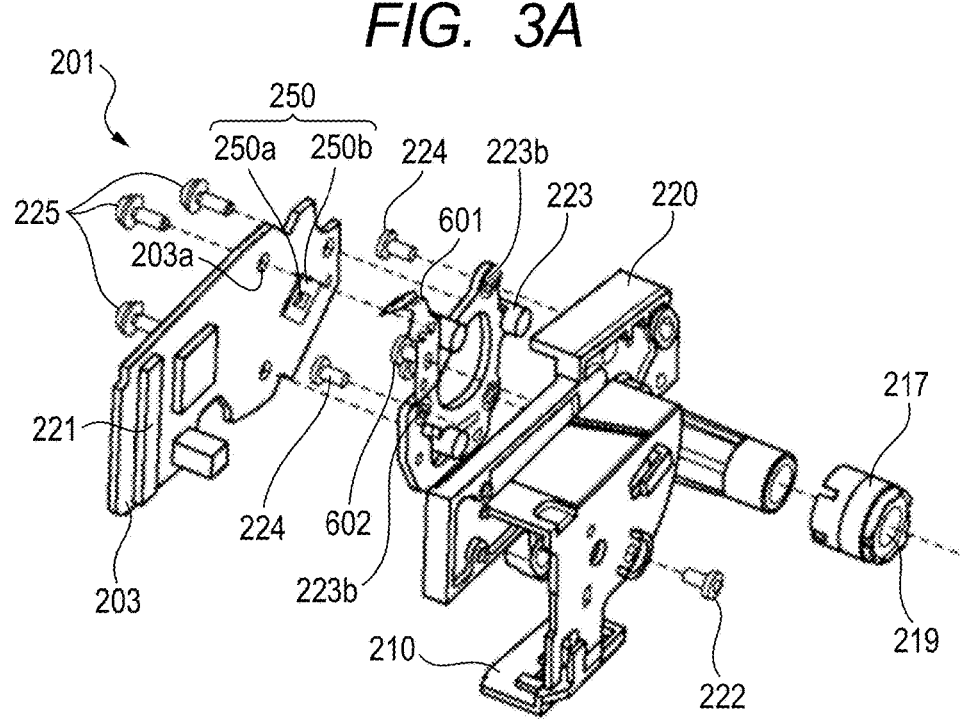
FIGS. 3A and 3B are exploded perspective views of an optical unit attached to a housing of the light scanning apparatus.
Figure 3B:
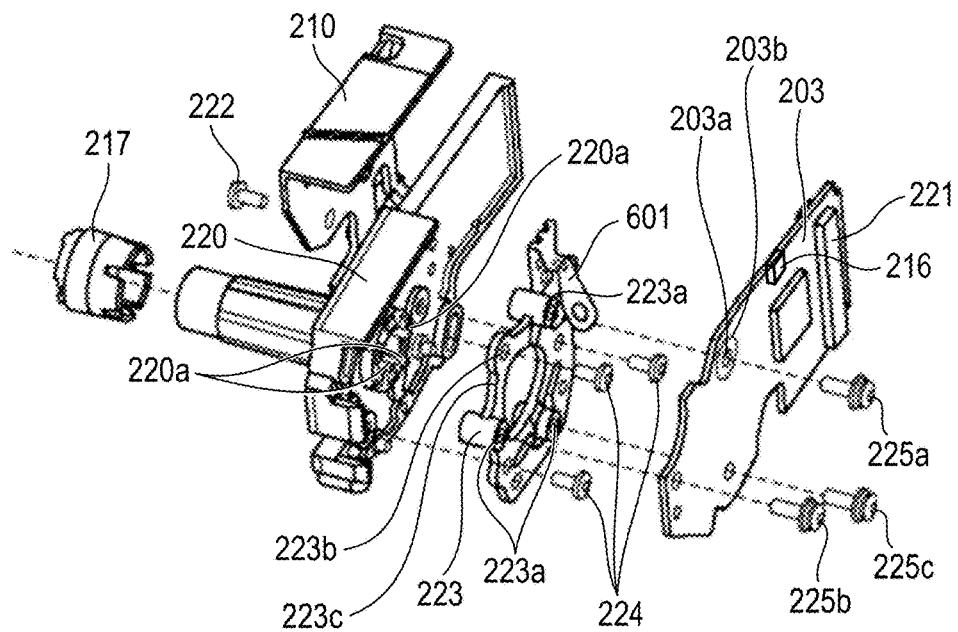

FIGS. 3A and 3B are exploded perspective views of the optical unit 201 attached to the housing 200 of the light scanning apparatus 4. FIG. 3A is a perspective view from a lens barrel portion 217 side. FIG. 3B is a perspective view from the drive circuit board (VCSEL substrate) 203 side.

In FIG. 3A, the optical unit 201 includes a VCSEL chip (laser chip) serving as the light source 250 that emits the light beam. VCSEL stands for Vertical Cavity Surface Emitting LASER. The optical unit 201 includes the drive circuit board 203 that is an electric substrate for driving the light source 250.

Figure 4A:
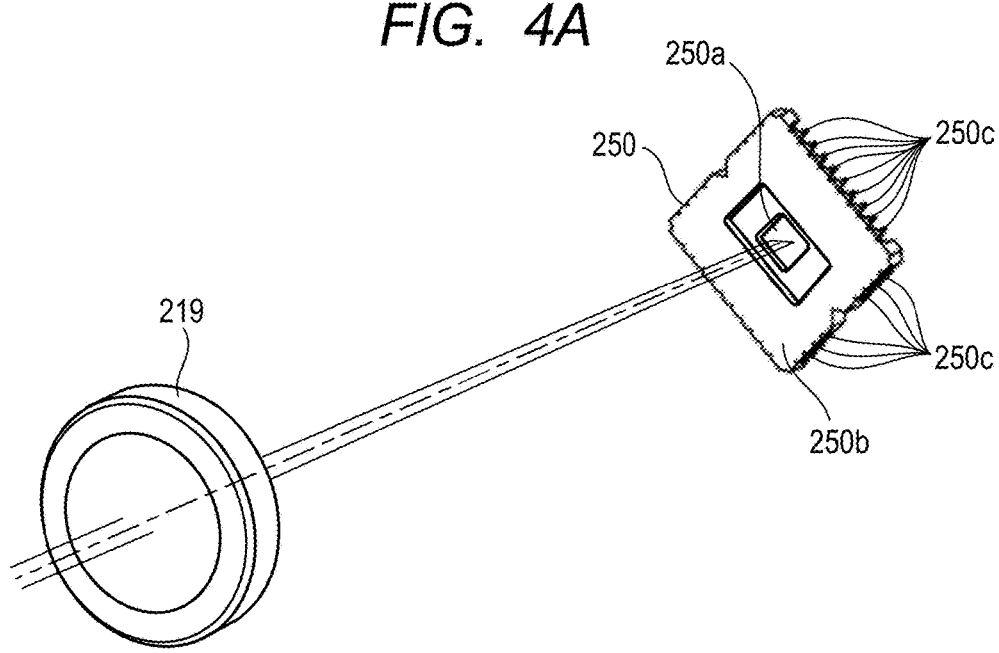
FIGS. 4A and 4B are perspective views of a light source.
Figure 4B:
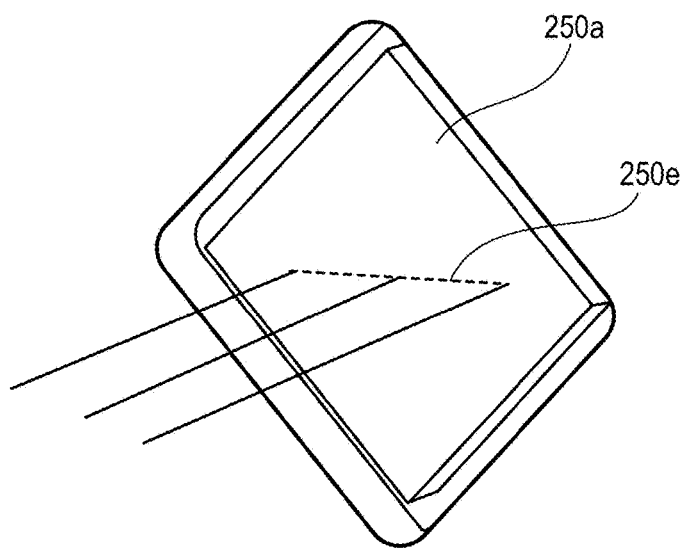

FIGS. 4A and 4B are perspective views of the light source 250. As illustrated in FIG. 4A, the light source 250 includes a package portion 250b to surround a light emitting portion 250a. Terminals 250c for receiving the current $I_{LD}$ to the light emitting portion 250a is disposed around the package portion 250b. The package portion 250b is formed of ceramic that is an insulator, such as $Al_2O_3$, $SiO_2$ or $TiO_2$. Adoption of the ceramic can obtain characteristics favorable in hardness and stiffness. In general, due to the characteristics of the material, a ceramic can easily achieve an accuracy in a submicron meter order. Consequently, the ceramic is suitable as the material of the package portion 250b. FIG. 4B is an enlarged diagram of the light emitting portion 250a. FIG. 4B illustrates the arrangement of light emitting elements (light emitting points) 250e of the light emitting portion 250a. In the light emitting portion 250a of this embodiment, the multiple light emitting elements 250e are arranged in one row (in an array). The light emitting elements 250e are arranged in the light scanning apparatus 4 so that light beams emitted from the respective elements 250e can be imaged at different positions on the photosensitive drum 2 in the rotation direction of the photosensitive drum 2. The arrangement of the light emitting elements 250e is not necessarily in one row. Alternatively, the arrangement may be in two rows. In this embodiment, the description has been made with the VCSEL chip (laser chip) as the light source 250. Alternatively, the light source 250 may be another laser diode (e.g. an edge emitting light emitting diode) having an analogous shape.

The light source 250 is disposed on the drive circuit board 203 illustrated in FIG. 3A. The terminals 250c are electrically connected to the electrode on the drive circuit board 203 through solder and a cable. Insertion holes 203a into which screws 225 for fixing the drive circuit board 203 are inserted are arranged on the drive circuit board 203. As illustrated in FIG. 3B, ground patterns 203b that are electrodes allowing charges to move between the holding member (laser holder) 220 and the drive circuit board 203 are disposed around the respective insertion holes 203a on the surface of the drive circuit board 203. The ground patterns 203b are formed of a material having a high conductivity, such as copper, and is electrically connected to some of the terminals 250c of the light source 250 through printed wiring.

The holding member 220 includes a lens barrel portion 217. A collimator lens 219 is attached to the distal end of the lens barrel portion 217. As illustrated in FIG. 3B, the holding member 220 includes three contact portions 220a at respective locations. The holding member 220 and the contact portions 220a require characteristics excellent in strength and stiffness, and are thus formed of a metal material, such as die-cast aluminum or die-cast magnesium.

The collimator lens 219 converts the light beam emitted from the light source 250 into parallel light. The collimator lens 219 detects the position irradiated with the light beam emitted from the light emitting portion 250a and the focus of the light beam using an adjustment jig in assembling of the light scanning apparatus 4, while the installation position to the holding member 220 is adjusted. After the installation position of the collimator lens 219 is determined, ultraviolet cure adhesive applied between the collimator lens 219 and the lens barrel portion 217 is irradiated with ultraviolet light, thereby allowing the collimator lens 219 to adhere and be fixed to the holding member 220.

The light emitting elements 250e provided for the light emitting portion 250a are supplied with current $I_{LD}$ from a drive portion 230 of the drive circuit board 203 to emit light beams. The drive circuit board 203 is connected to a CPU 301 (FIG. 7) through a connector 221 disposed on the drive circuit board 203 illustrated in FIG. 3B and an electric cable (not shown). A protective cover 210 is screwed to the holding member 220 by a screw 222 for protecting the drive circuit board 203. An earth plate 601 that is a conductive member is electrically connected to the holding member 220 and the drive circuit board 203. One end of the earth plate 601 is fixed to the holding member 220 by a screw 602 illustrated in FIG. 3A. The other end of the earth plate 601 is screwed to a connection member 223 by a screw 225a illustrated in FIG. 3B with the drive circuit board 203 intervening therebetween. The earth plate 601 is formed of a metal material, such as SUS. The details of the earth plate 601 will be described later.

Next, a configuration for fixing the drive circuit board 203 to the holding member 220 will be described. In FIG. 3B, the connection member 223 has a function of fixing the drive circuit board 203 to the holding member 220. The material of the connection member 223 is resin having an elasticity, such as PC+ABS or PA. As illustrated in FIG. 3B, the connection member 223 includes three fixation portions 223b for fixing the connection member 223 to the holding member 220 at respective three locations. The fixation portions 223b each have an insertion hole. The connection member 223 includes substrate support portions 223a and fixation portions 223b for attaching the drive circuit board 203 at three locations. A connection portion 223c is provided between the substrate support portions 223a and the fixation portions 223b.

A method of fixing the drive circuit board 203 to the holding member 220 is as follows. As illustrated in FIG. 3B, the connection member 223 is fixed to the holding member 220 by three screws 224. Next, the package portion 250b of the light source 250 mounted on the drive circuit board 203 is pressed against the contact portions 220a provided for the holding member 220 at the three locations. The contact portions 220a are accurately formed because the portions serve as the references of the position and attitude of the light source 250. The package portion 250b is thus pressed against the contact portions 220a, thereby allowing the desired position and attitude of the light source 250 to be achieved.

As illustrated in FIG. 3B, the thermistor 216 that detects the temperature of the light scanning apparatus 4 is mounted on the drive circuit board 203. However, the thermistor 216 is not disposed in the housing 200 of the light scanning apparatus 4, and detects the temperature of the drive circuit board 203 attached outside of the housing 200. The amount of variation in temperature detected by the thermistor 216 is used to operate the color misregistration amount.

(Drive Motor)

Figure 5A:
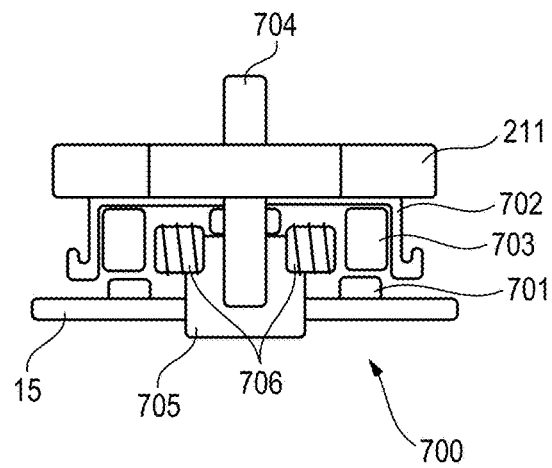
FIGS. 5A and 5B are diagrams illustrating a drive motor.
Figure 5B:
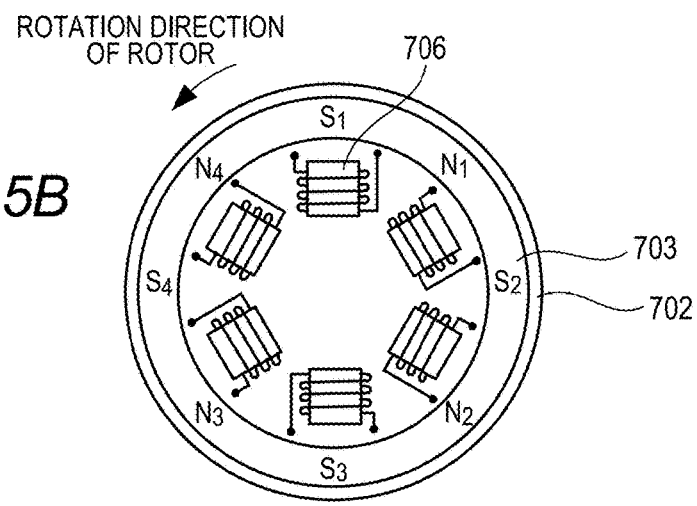

FIGS. 5A and 5B are diagrams illustrating the drive motor 700. The drive motor 700 includes Hall elements (frequency generators) 701 serving as speed detectors that detect the rotation speed of the drive motor 700. The Hall element (first pulse generation unit) 701 is a magnetic sensor that generates a Hall element signal (frequency signal) in synchronization with the rotation of the drive motor 700. A waveform generation circuit 802 (FIG. 6) generates an FG signal 16, based on the Hall element signal. The rotation speed of the rotary polygon mirror 211 is controlled according to an FG method (FG control) that controls the rotation speed of the drive motor 700 based on the FG signal 16. The rotary polygon mirror 211, the drive motor 700 and the Hall elements 701 constitute a deflection unit. A configuration of generating the FG signal 16 will hereinafter be described. FIG. 5A is a sectional view of the drive motor 700 and the rotary polygon mirror 211 fixed to this motor. The drive motor 700 includes a rotor 702, permanent magnets 703, a rotation shaft 704, a stator 705 and coils 706. The drive motor 700 is fixed to the circuit board (drive circuit board) 15. The Hall elements 701 are mounted on a circuit board 15. The multiple coils 706 are fixed to the stator 705 of the drive motor 700. The rotation shaft 704 is axially supported by a bearing provided for the stator 705, and rotates in the bearing. The rotor 702 is fixed to the rotation shaft 704. The permanent magnets 703 are fixed to the rotor 702. The rotary polygon mirror 211 is assembled to the rotor 702 in assembling of the light scanning apparatus 4. The rotary polygon mirror 211 is pressed against to the rotor 702 by a pressing member (not shown).

FIG. 5B is a diagram of the drive motor 700 illustrated in FIG. 5A in view of the rotor 702, the permanent magnets 703 and the coils 706 from the upper side in the rotation shaft direction. The rotor 702 is rotated in an arrow direction. As illustrated in FIG. 5B, the permanent magnets 703 are alternately magnetized to have S-poles and N-poles along the rotation direction of the rotor 702. The permanent magnets 703 in FIG. 5B are an example where the number of combinations of S-poles and N-poles is four. The period of the magnetization pattern may be another period. According to control of the timing of supplying current to the coils 706, the magnetic forces acting between the multiple coils 706 and the permanent magnets 703 rotate the rotor 702 and the permanent magnets 703 about the rotation shaft 704 in the arrow direction.

Figure 6:
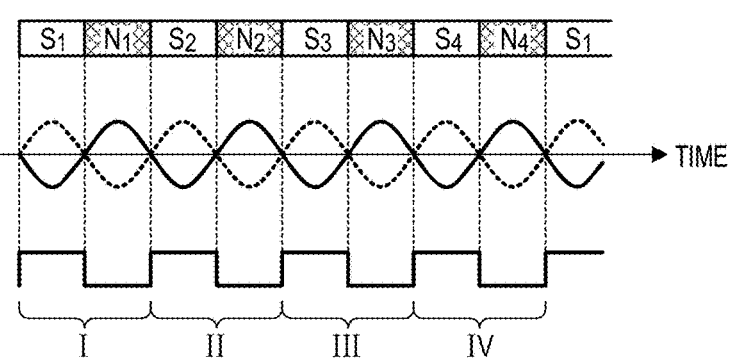
FIG. 6 is a diagram illustrating the pulse waveforms of a Hall element signal and an FG signal.

The Hall elements 701 are mounted on the circuit board 15. The Hall elements 701 are elements that detect the magnetic flux changes caused by the rotation of the permanent magnets 703 and output the magnetic flux changes as the Hall element signals. FIG. 6 is a diagram illustrating the pulse waveforms of the Hall element signal (output waveform) and the FG signal 16. As illustrated in FIG. 6, the magnetic poles of the permanent magnets 703 pass by the vicinities of the Hall elements 701 in an order of S1→N1→S2→N2→ . . . . By the S-poles and N-poles alternately passing through the Hall element 701, the Hall element 701 outputs a plurality of sine-wave Hall element signals that have phases different by 180 degrees and indicate the magnetic flux changes. The waveform generation circuit 802 generates a pulse-shaped FG signal 16 described later, based on the intersections of the multiple sine-wave Hall element signals. When the rotary polygon mirror 211 is assembled to the drive motor 700, an operator fixes the rotary polygon mirror 211 to the rotor 702 without consideration of the positional relationship between the positions of the reflection surfaces of the rotary polygon mirror 211 and the magnetization pattern.

Figure 7:
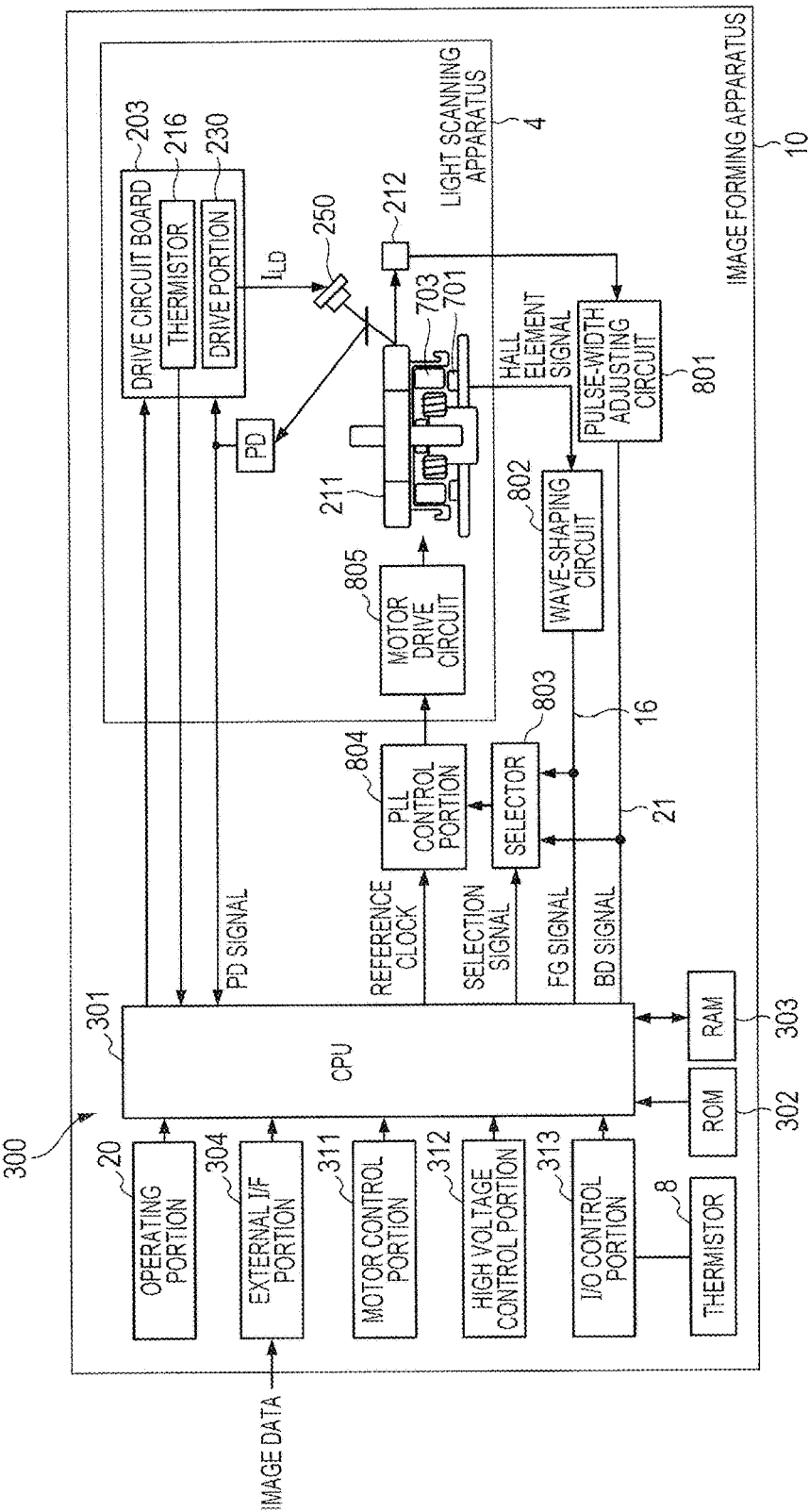
FIG. 7 is a block diagram of a control system.

As illustrated in FIG. 2A, the light scanning apparatus 4 includes: an optical detector (a beam detector; hereinafter referred to as BD) 212 serving as a light receiving portion; a BD reflecting mirror (not shown); and a BD lens 213. The BD reflecting mirror is disposed adjacent to an image region of the photosensitive drum 2 on which the electrostatic latent image is formed, in a non-image region outside of the image region. The light beam deflected by the rotary polygon mirror 211 enters the BD 212 via the first fe lens 204, the reflecting mirror 205, the reflecting mirror 206, the second fθ lens 207, the BD reflecting mirror and the BD lens 213. The BD (second pulse generation unit) 212 generates a synchronization signal (hereinafter a BD signal) for determining the timing of starting the light beam emission based on the image data so as to make the writing position in the main scanning direction constant. The BD signal 21 is input into the CPU 301, which serves as a controller, through a pulse width adjusting circuit 801 (FIG. 7). The rotation speed of the rotary polygon mirror 211 after light beam emission is controlled according to a BD method that controls the rotation speed of the drive motor 700 based on the BD signal 21 of the BD 212 (BD control).

(Flying Start)

As described above, the FG control and the BD control are selectively executed as the rotation control of the rotary polygon mirror 211. The BD control can control the rotation speed of the rotary polygon mirror 211 more accurately than the FG control. This is because the accuracy of the BD signal 21 is higher than the accuracy of the FG signal 16. On the other hand, the FG control has a lower accuracy in rotation control than the BD control has but can perform the rotation control of the rotary polygon mirror 211 without causing the light emitting elements 250e to emit light. Consequently, the FG control can perform the rotation control without reducing the lifetimes of the light emitting elements 250e.

The image forming apparatus 10 has a function (flying start function) that starts a preliminary operation of image formation before issuance of a start instruction, when an original is set to the image reading portion 100 and an operation is performed by the operator through the operating portion 20, for example. The operating portion 20 is provided with a copy start button 401, a numeric keypad 402 and a touch panel 403. In an embodiment, the copy start button 401 and the numeric keypad 402 may be displayed on the touch panel 403. When the copy start button 401 is pressed by the operator, an instruction of starting image formation is issued. When at least any one of setting the original to the image reading portion 100 and an operation by the operator to the numeric keypad 402 or the touch panel 403 in the operating portion 20 is performed before the copy start button 401 is pressed by the operator, the preliminary operation of image formation is started. The image forming apparatus 10 may have the flying start function that starts the preliminary operation of image formation upon detection of presence of the operator at a predetermined position adjacent to the image forming apparatus 10 by a human sensor or a camera (imaging element) provided for the image forming apparatus 10. When the image forming apparatus 10 starts the preliminary operation of image formation by the flying start function, this apparatus 10 activates the drive motor 700 to start the rotation of the rotary polygon mirror 211, thereby reducing a first copy time (FCOT).

When the CPU 301 determines that a predetermined condition is satisfied in a state where the rotary polygon mirror 211 is stopped, the CPU 301 starts the rotation of the rotary polygon mirror 211. The predetermined condition includes any one of the presence of the operator at the predetermined position adjacent to the image forming apparatus 10, setting of the original to the automatic original feeding portion 30, opening and closing of an original pressure plate, setting of the original on an original platen, and an operation by the operator to the operating portion 20. When the predetermined condition is satisfied in the state where the rotary polygon mirror 211 is stopped, the CPU 301 receives a print preparation request (image formation preparation signal). When the print preparation request (image formation preparation signal) is received, the CPU 301 rotates the rotary polygon mirror 211 according to the FG control before the copy start button 401 is pressed (before the image formation start signal is received).

The CPU 301 starts driving of the stopped drive portion 230 in the light scanning apparatus 4 in response to application of another predetermined operation to the operating portion 20 except the reading start input (print start request) before the reading start input is made to the operating portion 20. The CPU 301 may start driving of the stopped drive portion 230 of the light scanning apparatus 4 in response to placing of the original on the image reading portion 100 before the reading start input is applied to the operating portion 20. The CPU 301 controls the drive portion 230 of the light scanning apparatus (second light scanning apparatus) 4M so as to supply current $I_{LD}$ to the light source 250 of the light scanning apparatus 4M during driving of the drive portion 230 before the reading start input is made to the operating portion 20. The CPU 301 obtains a detection result (misregistration detection result) between the yellow toner image (first toner image) and the magenta toner image (second toner image) detected by a pattern sensor 45. The CPU 301 obtains the detection result (temperature detection result) of the thermistor 216 after the supply of the current $I_{LD}$ to the light source 250 is started. The CPU 301 corrects the deviation of the magenta toner image from the yellow toner image formed based on the image data according to the misregistration detection result and the temperature detection result. In response to application of another predetermined operation except the reading start input, the CPU 301 activates the drive motor 700 of the light scanning apparatus 4M using the period of magnetic flux change detected by the Hall elements 701 of the light scanning apparatus 4M. In response to placing of the original on the image reading portion 100, the CPU 301 may activate the drive motor 700 of the light scanning apparatus 4M using the period of magnetic flux change detected by the Hall elements 701 of the light scanning apparatus 4M. Subsequently, the CPU 301 supplies the current $I_{LD}$ to the light source 250 of the light scanning apparatus 4M so as to cause the BD 212 to generate a synchronization signal. In response to generation of the synchronization signal, the CPU 301 switches rotation control of the rotary polygon mirror 211 from control using the period of magnetic flux to control using the period of the synchronization signal.

(Control System)

Next, a control system 300 of the image forming apparatus 10 will be described. FIG. 7 is a block diagram of the control system 300. The control system 300 includes the CPU 301, a ROM 302, a RAM 303, an external I/F portion 304, the operating portion 20, a motor control portion 311, a high voltage control portion 312 and an I/O control portion 313. The CPU 301 is electrically connected to the ROM 302, the RAM 303, the external I/F portion 304, the operating portion 20, the motor control portion 311, the high voltage control portion 312 and the I/O control portion 313. The CPU 301 controls the image forming portion 1 and the light scanning apparatus 4. A program required for control is stored in the ROM 302. Setting values required for control are stored in the RAM 303. The external I/F portion 304 communicates with an external apparatus, such as a PC. The operating portion 20 as a user interface (UI) accepts an input by the user. The motor control portion 311 controls the speeds and the rotation directions of various motors to control the speeds and the rotation directions of various rollers. The high voltage control portion 312 controls the high voltage for development, charge and transfer. The I/O control portion 313 is connected to the thermistor 8 that detects the temperature in the developing device 5, receives a detection signal from the thermistor 8, and outputs the detection signal that indicates the temperature in the developing device 5 to the CPU 301. The BD signal 21 and the FG signal 16 are input into the CPU 301. The CPU 301 controls the rotation speed of the drive motor 700 based on one of the BD signal 21 and the FG signal 16 to control the rotation speed of the rotary polygon mirror 211. The thermistor 216 that detects the temperature of the drive circuit board 203 is provided on the drive circuit board 203. The thermistor 216 outputs the detection signal that indicates the temperature of the drive circuit board 203 to the CPU 301.

The CPU 301 outputs, to a selector 803, a selection signal that allows the FG signal 16 to be input from the selector 803 into a PLL control portion 804. The selector 803 inputs the FG signal 16 into the PLL control portion 804 but does not input the BD signal 21 into the PLL control portion 804, according to the selection signal. The CPU 301 outputs, to the PLL control portion 804, a reference CLK corresponding to the FG signal 16. A reference clock corresponding to the FG signal 16 is a period signal having a period corresponding to the target rotation speed of the rotary polygon mirror 211. The PLL control portion 804 transmits an acceleration signal and a deceleration signal to a motor drive circuit 805 so that the period of the FG signal 16 to be input into the PLL control portion 804 can coincide with the period of the reference clock.

On the other hand, the CPU 301 outputs, to the selector 803, the selection signal that allows the BD signal to be input from the selector 803 into a PLL control portion 804. The selector 803 inputs the BD signal 21 into the PLL control portion 804 but does not input the FG signal into the PLL control portion 804, according to the selection signal. The CPU 301 outputs, to the PLL control portion 804, the reference clock corresponding to the BD signal 21. The reference clock is a period signal that has a period different from the reference clock corresponding to the FG signal 16 and is a period corresponding to the target rotation speed of the rotary polygon mirror 211. The PLL control portion 804 transmits an acceleration signal and a deceleration signal to the motor drive circuit 805 so that the period of the BD signal 21 to be input into the PLL control portion 804 can coincide with the period of the reference clock corresponding to the BD signal.

The CPU 301 performs the rotation control for the drive motor 700 according to the FG method, based on the detection result of the period of the FG signal 16 when the drive motor 700 is activated from the stop state. As the rotation speed of the drive motor 700 reaches a value close to the target rotation speed, the CPU 301 switches the rotation control according to the FG method to the rotation control according to the BD method for the drive motor 700 based on the detection result of the period of the BD signal 21. The CPU 301 forms an image based on the image data in the state of the rotation control according to the BD method for the drive motor 700 based on the detection result of the period of the BD signal 21. In the state where the rotary polygon mirror 211 is stopped, the BD signal 21 is not generated. Accordingly, the CPU 301 executes feedback control for the drive motor 700 using the FG signal 16, as control from the activation of the rotary polygon mirror 211 to achievement of a value around the target rotation speed.

On the other hand, the FG signal 16 is generated based on the Hall element signals output from the Hall elements 701, but the outputs of the Hall elements 701 include high frequency noise. Meanwhile, the output of the BD 212 that is a light receiving element has a smaller amount of noise than the outputs of the Hall elements 701 have. That is, the period of the BD signal 21 has smaller variation than the period of the FG signal 16 has. Accordingly, the CPU 301 switches the rotation control for the drive motor 700 before start of image formation from the feedback control using the FG signal 16 to the feedback control using the BD signal 21, and executes the feedback control for the drive motor 700 using the BD signal 21 during image formation.

Figure 8:
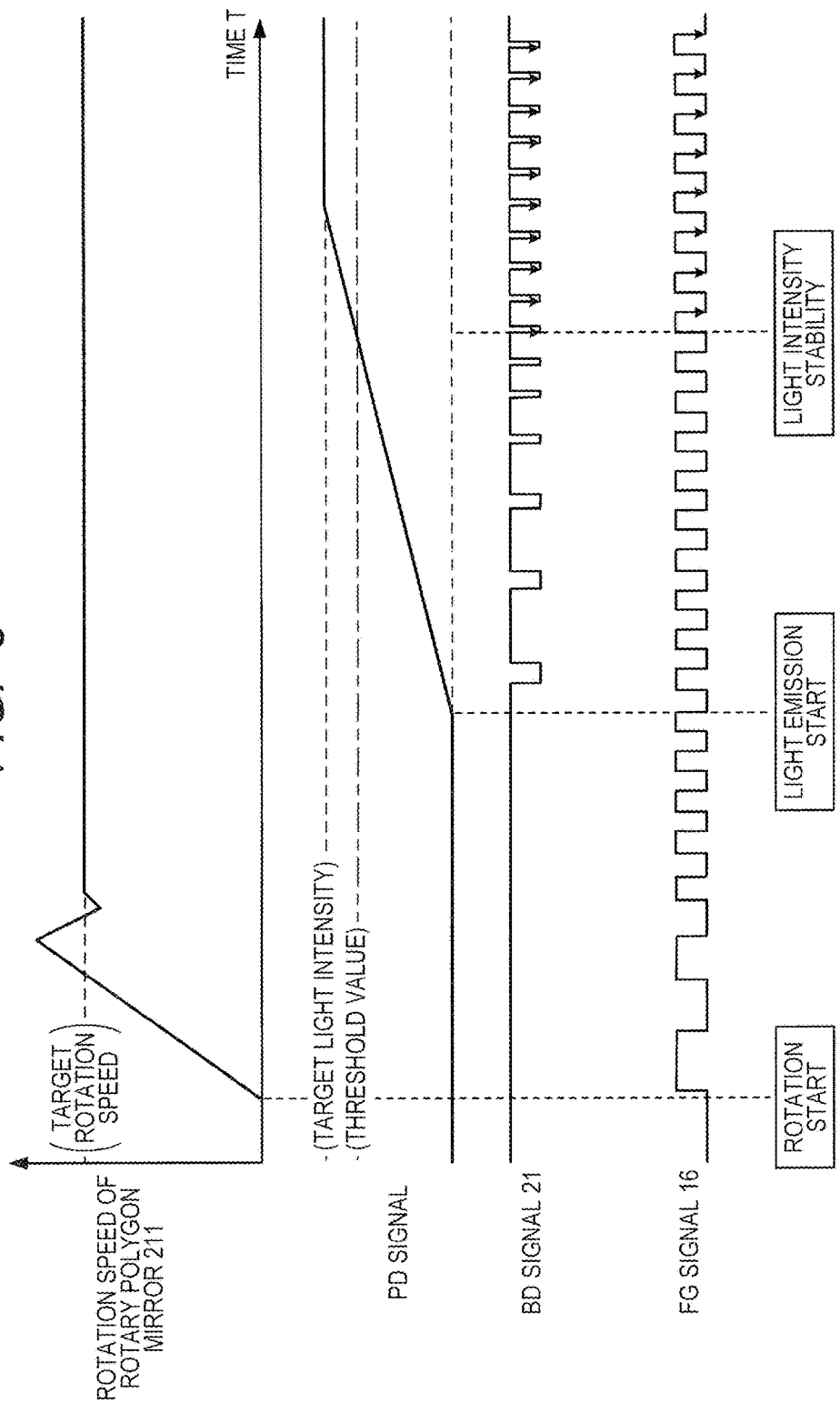
FIG. 8 is a timing chart at an activation of a rotary polygon mirror.

FIG. 8 is a timing chart at an activation of the rotary polygon mirror 211. In FIG. 8, in response to input of an image formation job into the image forming apparatus 10, the CPU 301 forms a feedback control loop for the drive motor 700 using the period of the FG signal 16. The formation of the feedback loop allows the PLL control portion 804 to transmit the acceleration signal to the motor drive circuit 805 so that the period of the FG signal 16 can coincide with the period of the reference clock for the FG signal. In response to the acceleration signal, the motor drive circuit 805 controls the current to be supplied to the drive motor 700. The current is supplied to the coils 706, thereby starting the rotation of the drive motor 700. The rotation of the drive motor 700 generates the FG signal 16. The CPU 301 controls the drive motor 700 so that the period of the FG signal 16 can be a target period.

(Color Misregistration Correction)

Next, color misregistration correction will be described. The color misregistration is caused by the thermal expansion of the first fθ lens 204 and the second fθ lens 207 of the light scanning apparatus 4, which are made of plastic, due to heat sources, such as various motors, a heater in the fixing portion 107 and a power source, which are operated during image formation, and to variation in ambient environment. The color misregistration correction is performed by correction through an automatic registration adjustment mechanism and by correction through color misregistration amount prediction. The automatic registration adjustment mechanism forms a color misregistration detection toner pattern (registration correction pattern) on the intermediate transfer member 104 for every predetermined number of sheets. The pattern sensor as a pattern detector provided on the intermediate transfer member 104 detects the color misregistration detection toner pattern (hereinafter called a pattern image). The pattern image is detected over the peripheral length around the intermediate transfer member 104, and feedback control is performed to the image writing start timing. Correction by the automatic registration adjustment mechanism is performed at a timing different from that during image formation. Consequently, increase in frequency reduces the productivity. To prevent the productivity from decreasing, correction through the color misregistration amount prediction is performed. As to the correction through the color misregistration amount prediction, the color misregistration amount (predicted value X) is predicted using a detection signal of the thermistor 216 provided on the drive circuit board 203 outside of the light scanning apparatus 4 and the detection signal of the thermistor 8 provided in the developing device 5, and the color misregistration correction is performed. The color misregistration correction is executed by the CPU 301 serving as a color misregistration correction unit (controller).

((Correction by Automatic Registration Adjustment Mechanism))

The image forming apparatus 10 actually measures the color misregistration amount through the automatic registration adjustment mechanism at a predetermined timing. To measures the color misregistration amount actually, the image forming apparatus 10 forms the pattern images on the intermediate transfer member 104, causes the pattern sensor 45 to measures the pattern images, and generates the actual measurement value of the color misregistration amount based on the measurement result.

Figure 9:
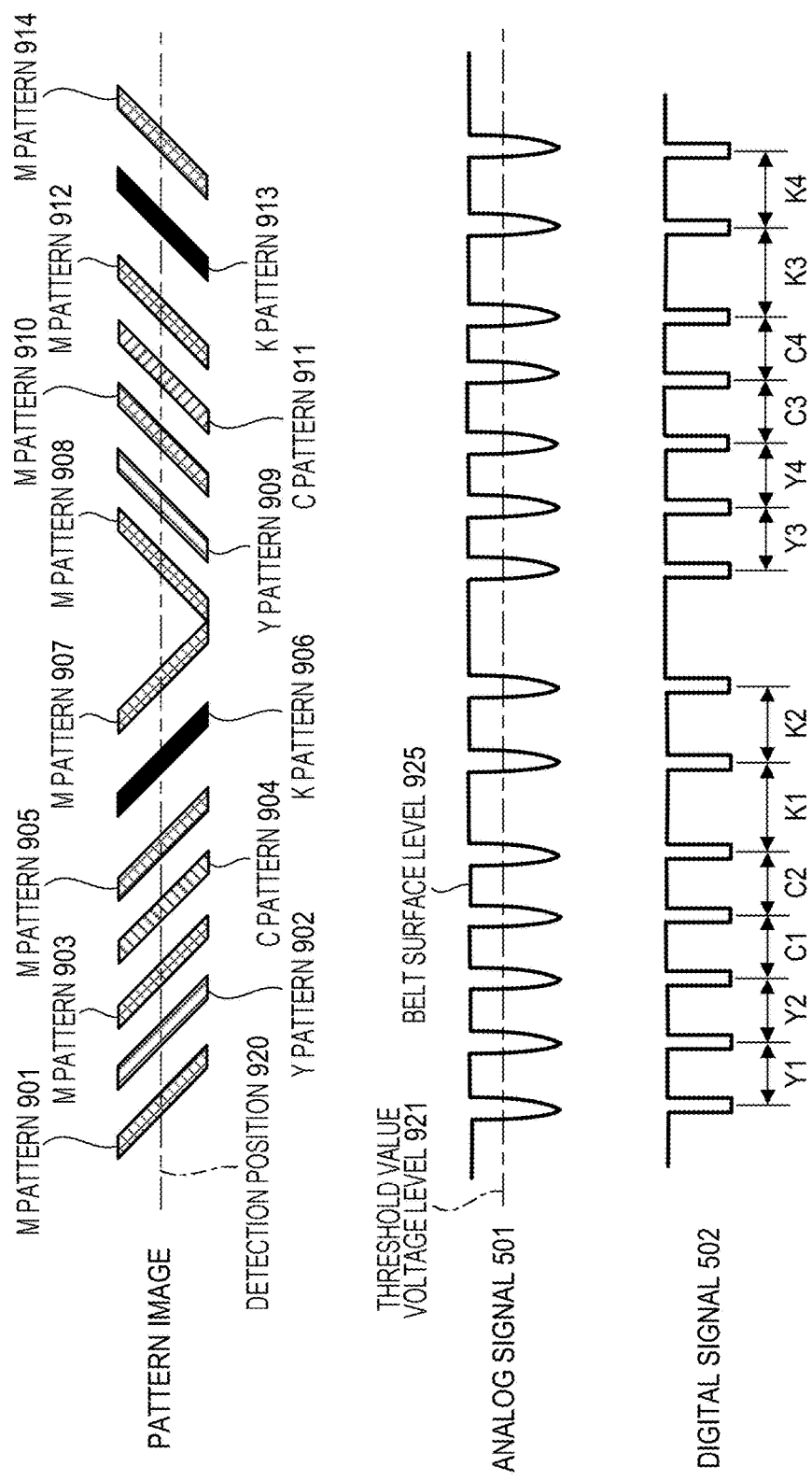
FIG. 9 is a diagram illustrating a pattern image, an analog signal and a digital signal.

The pattern image formed on the intermediate transfer member 104 will be described. FIG. 9 is a diagram illustrating the pattern image, an analog signal 501 and a digital signal 502. As illustrated in FIG. 9, the pattern images 901 to 914 include pattern images inclined by 45 degrees from the conveyance direction of the intermediate transfer member 104, and pattern images inclined by −45 degrees from the conveyance direction. The magenta pattern images 901, 903, 905, 907, 908, 910, 912 and 914 that are reference images are formed so that yellow, cyan and black pattern images can each interpose therebetween. The yellow pattern image 902 is formed between the magenta pattern images 901 and 903. The cyan pattern image 904 is formed between the magenta pattern images 903 and 905. The black pattern image 906 is formed between the magenta pattern images 905 and 907. The yellow pattern image 909 is formed between the magenta pattern images 908 and 910. The cyan pattern image 911 is formed between the magenta pattern images 910 and 912. The black pattern image 913 is formed between the magenta pattern images 912 and 914.

The pattern sensor 45 detects the pattern images 901 to 914 at a detection position 920 and outputs the analog signal 501. A comparator 508 digitizes the analog signal 501 and outputs the digital signal 502. The analog signal 501 and the digital signal 502 correspond to the measurement result of the pattern sensor 45.

A color misregistration determining portion 506 (FIG. 11) obtains a timing at which the digital signal 502 output from the comparator 508 is switched from a high level to a low level, and a timing at which the signal is switched from the low level to the high level. The color misregistration determining portion 506 determines each of timings at which the pattern sensor 45 detects the pattern images 901 to 914, based on the timing at which the digital signal 502 is switched from the high level to the low level and the timing at which the signal is switched from the low level to the high level. For example, the color misregistration determining portion 506 determines the timing T at which the pattern sensor 45 has detected each of the pattern images 901 to 914 based on Expression (1).

$$T=(Tb-Ta)/2+Ta \qquad \text{Expression (1)}$$

The timing Ta is a timing at which the digital signal 502 is switched from the high level to the low level. The timing Tb is a timing at which the digital signal 502 is switched from the low level to the high level. That is, the timing T is an intermediate timing between the timing Ta at which the digital signal 502 is switched from the high level to the low level and the timing Tb at which the digital signal 502 is switched from the low level to the high level.

The CPU 301 determines the intervals Y1, Y2, C1, C2, K1, K2, Y3, Y4, . . . between timings at which the pattern images 901 to 914 are detected. The intervals are stored in the RAM 303. The CPU 301 calculates the difference (color misregistration amount) of the position where the image of a color other than magenta (yellow, cyan or black) is formed from the position where the magenta image is formed, based on the stored detected data.

For example, the color misregistration amount ΔHy of the yellow image from the magenta image in the direction (main scanning direction) orthogonal to the conveyance direction of the intermediate transfer member 104 is calculated based on Expression (2).

$$\Delta Hy=\{(Y4-Y3)/2-(Y2-Y1)/2\}/2 \qquad \text{Expression (2)}$$

For example, the color misregistration amount ΔVy of the yellow image from the magenta image in the conveyance direction (sub-scanning direction) of the intermediate transfer member 104 is calculated based on Expression (3).

$$\Delta Vy=\{(Y4-Y3)/2+(Y2-Y1)/2\}/2 \qquad \text{Expression (3)}$$

Likewise, the color misregistration amounts ΔHc and ΔVc of the cyan image, and the color misregistration amounts ΔHk and ΔVk of the black image are also calculated using operation expressions.

A timing correction portion 507 corrects the writing start timings of the light scanning apparatuses 4Y, 4M, 4C and 4K at the respective image forming portions 1Y, 1M, 1C and 1K, based on the color misregistration amounts on the relative positional misregistration of color images other than the image of magenta, which serves as the reference color.

The predetermined timing at which the pattern image is formed to obtain the actual measurement value of the color misregistration amount may be determined based on the amount of temperature change in the image forming apparatus 10. Alternatively, this timing may be determined based on the number of image-formed sheets. For example, if the difference between the detected temperature of the thermistor 216 when the image forming apparatus 10 formed the pattern image last time and the current detected temperature of the thermistor 216 is larger than a threshold value, the image forming apparatus 10 forms the pattern image and updates the actual measurement value of the color misregistration amount. Alternatively, for example, when the number of images formed on sheets S by the image forming apparatus 10 reaches a predetermined number after the image forming apparatus 10 formed the pattern image last time, the image forming apparatus 10 forms the pattern image and updates the actual measurement value of the color misregistration amount.

((Correction by Color Misregistration Amount Prediction))

The image forming apparatus 10 causes downtime due to update of the actual measurement value of the color misregistration amount. Consequently, if the image forming apparatus 10 frequently updates the actual measurement value of the color misregistration amount, the productivity of the image forming apparatus 10 decreases. Accordingly, the image forming apparatus 10 predicts the color misregistration amount based on the detected temperature of the thermistor 216 during a time period between the timing at which the actual measurement value of the color misregistration amount is updated and the timing at which the actual measurement value of the color misregistration amount is updated next time.

Figure 10:
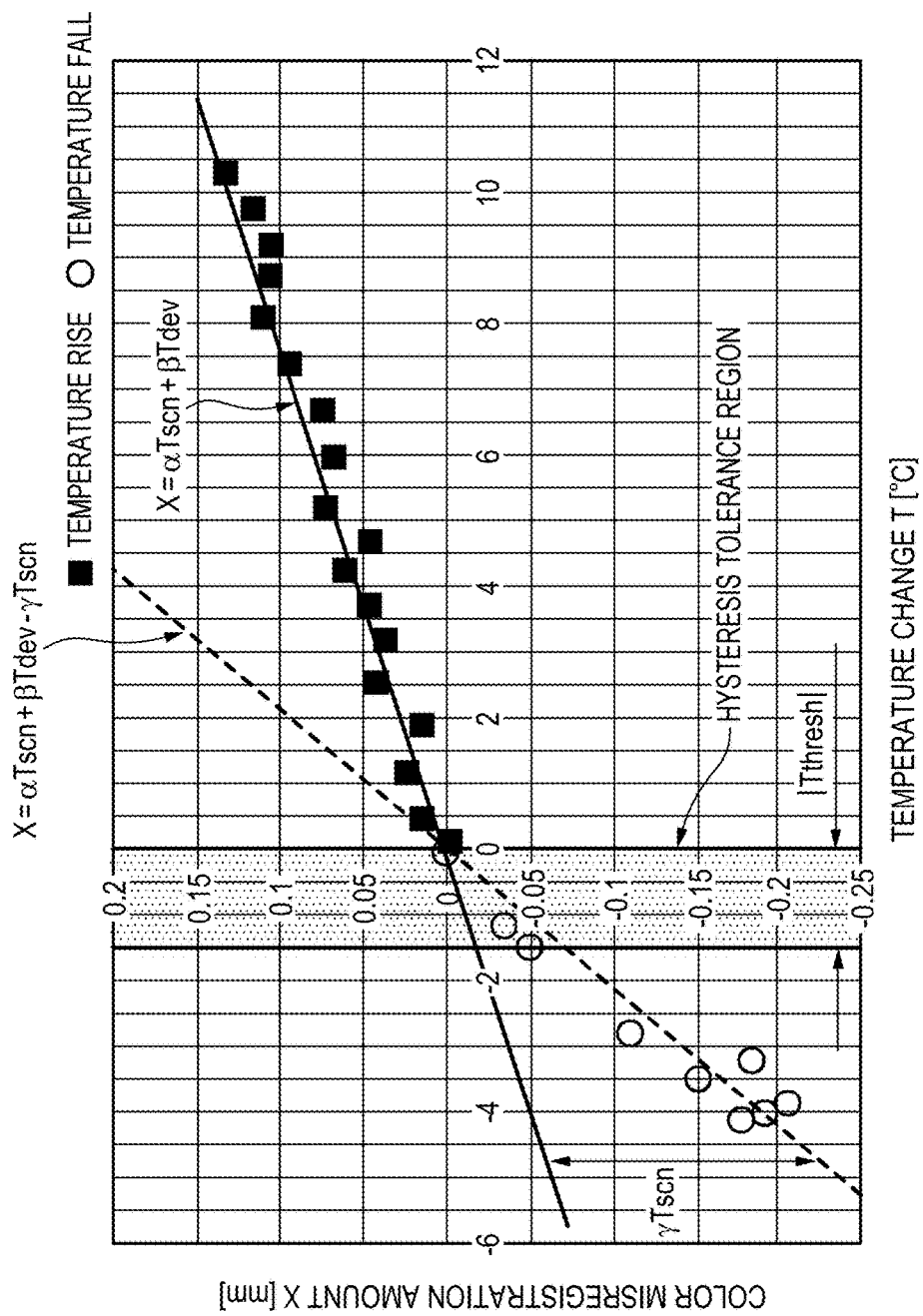
FIG. 10 is a diagram illustrating the relationship between the amount of variation in temperature detected by a thermistor and the amount of variation in color misregistration amount.

FIG. 10 is a diagram illustrating the relationship between the amount of variation in temperature detected by the thermistor 216 and the amount of variation in color misregistration amount. Referring to FIG. 10, it can be understood that the relationship between the amount of variation in the detected temperature of the thermistor 216 and the amount of variation in the color misregistration amount in a case where the detected temperature rises is different from the relationship between the amount of variation in the detected temperature of the thermistor 216 and the amount of variation in color misregistration amount in a case where the detected temperature falls. Consequently, it is required to determine whether the temperature of the light scanning apparatus 4 rises or falls and to predict the color misregistration amount based on the determination result and the amount of variation in the detected temperature of the thermistor 216. When the temperature of the light scanning apparatus 4 increases, the color misregistration amount is predicted based on a conversion condition (first conversion condition) used for the case of temperature rise. When the temperature of the light scanning apparatus 4 falls, the color misregistration amount is predicted based on a conversion condition (second conversion condition) used for the case of temperature fall. However, in this embodiment, in a hysteresis tolerance region, the color misregistration amount is predicted based on the conversion condition (first conversion condition) used for the temperature rise even when the temperature of the light scanning apparatus 4 falls. Consequently, even when the image forming operation is executed after the image forming apparatus 10 is left without any operation, the color misregistration amount can be accurately predicted. A specific conversion condition will be described later.

Figure 11:
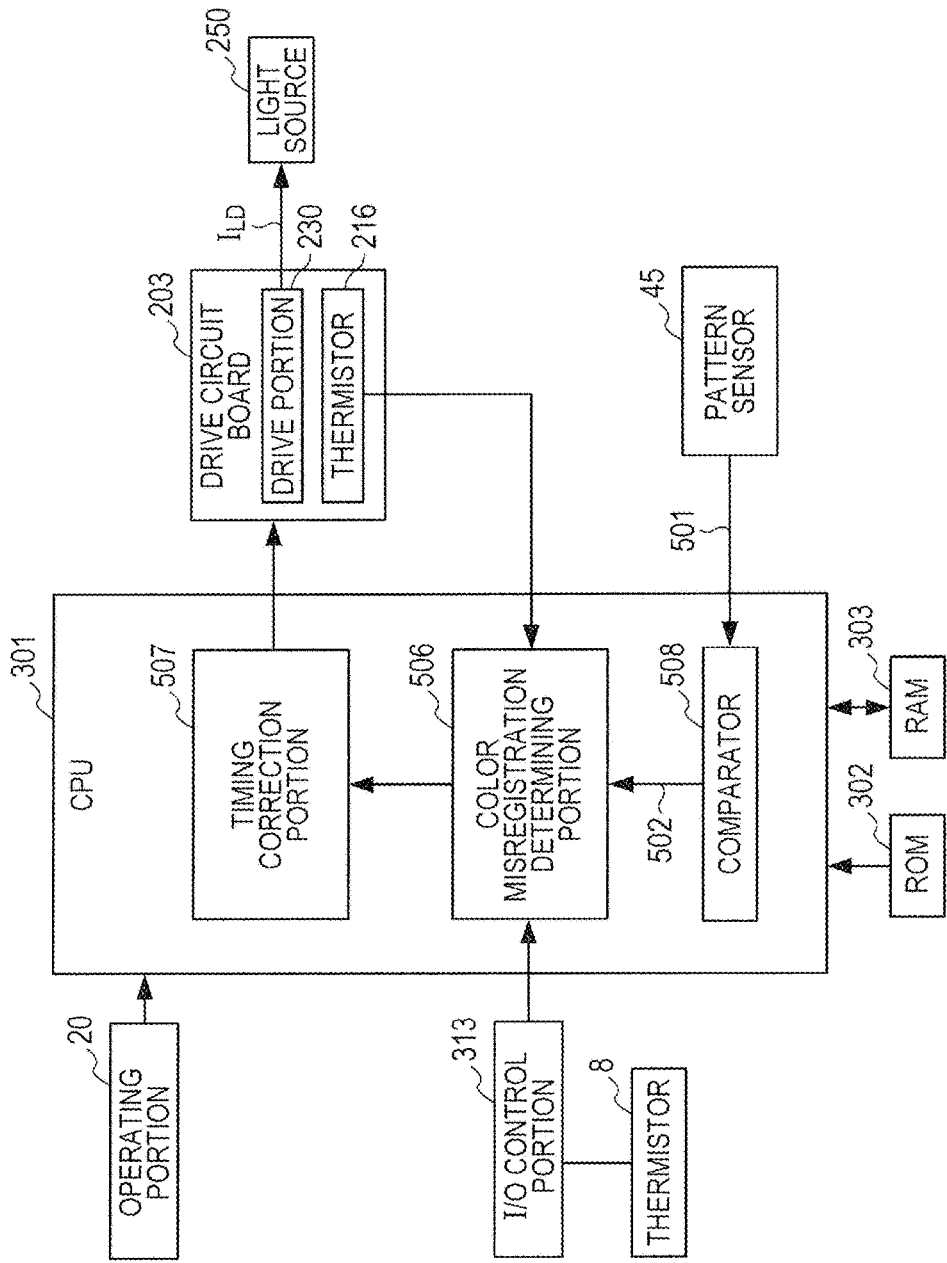
FIG. 11 is a block diagram of a control system for correcting the color misregistration amount.

Next, a control system for correcting the color misregistration amount will be described with reference to FIG. 11. FIG. 11 is a block diagram of the control system for correcting the color misregistration amount. The CPU 301 includes the color misregistration determining portion 506, the timing correction portion 507 and the comparator 508. The color misregistration determining portion 506 determines the color misregistration amount based on the amount of variation in the detected temperature of the thermistor 216 and the amount of variation in the detected temperature of the thermistor 8. The color misregistration determining portion 506 determines the color misregistration amounts ΔH and ΔV by adding the actual measurement value of the color misregistration amount obtained using the pattern image to the color misregistration amount determined based on the detected temperature. The color misregistration amount ΔH in the direction orthogonal to the conveyance direction of the intermediate transfer member 104 is an amount obtained by adding the predicted value of the color misregistration amount to the actual measurement value of the color misregistration amount. Likewise, the color misregistration amount ΔV in the conveyance direction of the intermediate transfer member 104 is an amount obtained by adding the predicted value of the color misregistration amount to the actual measurement value of the color misregistration amount.

The timing correction portion 507 shifts the writing position of the image in the direction orthogonal to the conveyance direction of the intermediate transfer member 104, by the distance of pixels corresponding to the color misregistration amount ΔH with reference to an image formation reference position in the direction of scanning with the light beam emitted from the light scanning apparatus 4. For example, the color misregistration determining portion 506 determines the timing at which light is emitted from the light scanning apparatus 4 to the BD 212, based on the BD signal 21 output from the BD 212. The scanning speed of the light beam emitted from the light scanning apparatus is predetermined because the speed corresponds to the rotation speed of the rotary polygon mirror 211 of the light scanning apparatus 4. Consequently, the timing correction portion 507 calculates a time period from a time when the BD 212 is irradiated with the light beam to a time when the light beam reaches the position shifted from the image formation reference position by pixels corresponding to the color misregistration amount ΔH. The timing correction portion 507 corrects the writing start timing in the main scanning direction by adding the calculated time period to the time when the BD 212 output the BD signal 21.

The timing correction portion 507 shifts the writing position of the image in the conveyance direction of the intermediate transfer member 104, by the distance corresponding to the color misregistration amount ΔV with reference to an image formation reference position in the direction where the surface of the photosensitive drum 2 moves. The rotation speed of the photosensitive drum 2 is predetermined. For example, the timing correction portion 507 calculates a time period in which the light beam of the light scanning apparatus 4 reaches the position to which the photosensitive drum 2 has moved by the distance corresponding to the color misregistration amount ΔV, with reference to the predetermined image formation timing. The timing correction portion 507 calculates the writing start timing in the sub-scanning direction by adding the calculated time period to the predetermined image formation timing.

Consequently, a position on the intermediate transfer member 104 where an image other than the reference image is formed can be corrected with reference to the position where the reference image is formed. The color misregistration amounts ΔHy, ΔVy, ΔHc, ΔVc, ΔHk and ΔVk calculated from the results of detection of the pattern images 901 to 914 are stored in the RAM 303.

The image forming operation of forming an image based on the image data by the image forming apparatus 10 will be described based on the flowchart of FIG. 7. When the main power source of the image forming apparatus 10 is turned on, the CPU 301 reads the program stored in the ROM 302 and executes the color misregistration correction. The CPU 301 then stores, in the RAM 303, the actual measurement value of the color misregistration amount, and the temperatures detected by the thermistors 216 and 8.

Next, calculation of the color misregistration amount (predicted value X) predicted based on the temperature change. The color misregistration amount is calculated for every time of image formation using the difference (temperature difference) between the temperature in last image formation and the temperature in image formation this time. The detected temperature Tscn is obtained based on the detection signal of the thermistor 216 on the drive circuit board 203 provided outside of the light scanning apparatus 4. The detected temperature Tdev is obtained based on the detection signal of the thermistor 8 provided in the developing device 5. The index (NOW) of the detected temperature Tscn, the detected temperature Tdev and the predicted value X indicates the value of image formation this time. The index (PREV) indicates the value of image formation last time. The predicted value X is a value for correcting one of the color misregistration amount ΔH in the direction (main scanning direction) orthogonal to the conveyance direction of the intermediate transfer member 104 and the color misregistration amount ΔV in the conveyance direction of the intermediate transfer member 104 (sub-scanning direction).

In a case of a consecutive image formation job that forms images on multiple sheets S, the image formation this time is image formation to a page this time, and the image formation last time is image formation to the previous page. The temperature difference ΔTscn between the detected temperature Tscn(NOW) in image formation this time obtained based on the detection signal of the thermistor 216 on the drive circuit board 203 and the detected temperature Tscn(PREV) in image formation last time is represented in the following expression.

$$\Delta Tscn = Tscn(NOW) - Tscn(PREV)$$

The temperature difference ΔTdev between the detected temperature Tdev(NOW) in image formation this time obtained based on the detection signal of the thermistor 8 provided in the developing device 5 and the detected temperature Tdev(PREV) in image formation last time is represented in the following expression.

$$\Delta Tdev = Tdev(NOW) - Tdev(PREV)$$

The predicted value X(NOW) that is the color misregistration amount predicted in image formation this time is represented by the following expression.

$$X(NOW) = X(PREV) + Kscn \times \Delta Tscn + Kdev \times \Delta Tdev$$

A coefficient Kscn and a coefficient Kdev represent respective values for correcting the temperature difference ΔTscn and the temperature difference ΔTdev. The color misregistration amount, the detected temperature Tscn and the detected temperature Tdev in a print operation after consecutive print operations or being left in the standby state are preliminarily measured. The coefficient Kscn and the coefficient Kdev are obtained based on the measurement results. Furthermore, analogous measurement may be performed in multiple image forming apparatuses 10, and the coefficient Kscn and the coefficient Kdev that are specific to each image forming apparatus 10 may be obtained based on averaged measurement results.

In this embodiment, in consideration of the hysteresis tolerance region, the expression described above is deformed as follows. In a case where the detected temperature Tscn(NOW) of the thermistor 216 is lower than the last detected temperature Tscn(PREV) of the thermistor 216 and the difference of the detected temperatures is at least a predetermined temperature Tth, the color misregistration determining portion 506 calculates the predicted value X based on the following expression.

$$X(NOW) = X(PREV) + \alpha \times \Delta Tscn + \beta \times \Delta Tdev - \gamma \times \Delta Tscn$$

Here, the coefficients α, β and γ and the predetermined temperature Tth are preliminarily determined by an experiment.

In a case where the detected temperature Tscn(NOW) of the thermistor 216 is at least the last detected temperature Tscn(PREV) or a case where the difference between the detected temperatures is less than the predetermined temperature Tth, the color misregistration determining portion 506 calculates the predicted value X based on the following expression.

$$X(\text{NOW})=X(\text{PREV})+\alpha \times \Delta T\text{scn}+\beta \times \Delta T\text{dev}$$

The color misregistration correction based on the thus obtained predicted value X(NOW) can suppress the color misregistration without downtime. The CPU 301 performs the color misregistration correction by controlling the timing of starting emission of the light beam in the sub-scanning direction perpendicular to the main scanning direction, based on the predicted value X(NOW). In this embodiment, the color misregistration correction in the sub-scanning direction is performed in unit of one pixel (about 10.58 μm) at a resolution of 2400 dpi.

To obtain the temperature rise amount (temperature difference ΔTscn) in the light scanning apparatus 4 used to calculate the predicted color misregistration amount (predicted value X), this embodiment uses the detected temperature Tscn based on the detection signal of the thermistor 216 disposed on the drive circuit board 203 outside of the light scanning apparatus 4. This is because the temperature rise amount in the light scanning apparatus 4 due to rotation of the rotary polygon mirror 211 during image formation has the same tendency as the temperature rise amount of the thermistor 216 on the drive circuit board 203 due to light beam emission. Consequently, the thermistor 216 is only required to be provided adjacent to the drive circuit board 203 in a range of being affected by the temperature rise of the drive circuit board 203 due to light beam emission. The thermistor 216 is not necessarily provided on the drive circuit board 203. For example, the thermistor 216 may be provided on the housing 200 near the drive circuit board 203. Alternatively, the thermistor 216 may be disposed on the holding member 220 that holds the drive circuit board 203.

(Reduction in Printing Time)

To reduce the first printing time (FPOT) and first copy time (FCOT), the rotation of the rotary polygon mirror 211 is started at early timing, and the rotary polygon mirror 211 is rotated at a stationary speed without light beam emission. Here, the FPOT is a time period required from starting the reception of a first page data to completion of printing and completion of ejecting the sheet S. The FCOT is a time period required from pressing of a copy start button to completion of the copy and completion of ejecting the first sheet S to the outside of the apparatus. An FG 215 of the drive motor 700 generates the FG signal that is proportional to the rotation speed of the rotary polygon mirror 211. The CPU 301 measures the occurrence period of the FG signal (pulse signal), and controls the rotation speed of the drive motor 700 according to the FG method so that the occurrence period of the FG signal can be a predetermined period. When the occurrence period of the FG signal reaches the predetermined period, the CPU 301 determines that the rotation speed of the rotary polygon mirror 211 reaches a predetermined rotation speed. In the state where the rotary polygon mirror 211 stably rotates at the predetermined rotation speed, the CPU 301 causes the light source 250 to emit the light beam, and controls the rotation speed of the drive motor 700 according to the BD method based on the BD signal from the BD 212 that detects the light beam. Upon receipt of the print start request (print start trigger), the CPU 301 starts the image forming operation at a time point when the period of the BD signal reaches the period proportional to the target rotation speed of the rotary polygon mirror 211.

(Relationship Between Detected Temperature and Color Misregistration)

Figure 12:
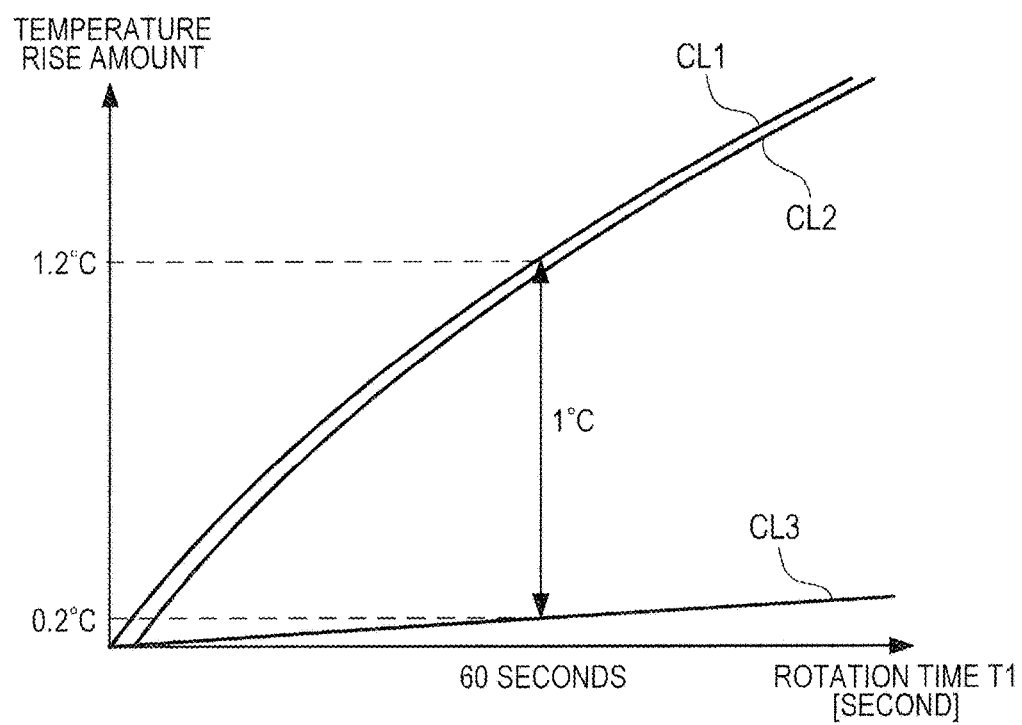
FIG. 12 is a diagram illustrating the temperature rise amounts of the thermistor in cases with and without light beam emission.

Next, the relationship between the detected temperature of the thermistor 216 provided on or adjacent to the drive circuit board 203 outside of the light scanning apparatus 4 and the color misregistration. FIG. 12 is a diagram illustrating the temperature rise amounts of the thermistor 216 in cases with and without light beam emission. The abscissa axis of FIG. 12 represents the rotation time (second), and the ordinate axis represents the temperature rise amount (° C.). A curve CL1 represents the temperature rise amount of the internal temperature of the light scanning apparatus 4. A curve CL2 represents the temperature rise amount of the detected temperature of the thermistor 216 on the drive circuit board 203 in a case where light beam emission is started immediately after start of the rotation of the rotary polygon mirror 211 and then the rotary polygon mirror 211 is rotated in a state where the light source 250 emits the light beam. A curve CL3 represents the temperature rise amount of the detected temperature of the thermistor 216 on the drive circuit board 203 in a case where the rotary polygon mirror 211 is rotated in a state where the light source 250 does not emit the light beam.

As understood from the curve CL2, in the case where the rotary polygon mirror 211 is rotated in the state where the light beam is emitted immediately after the start of rotation of the rotary polygon mirror 211, the temperature rise amount of the detected temperature of the thermistor 216 on the drive circuit board 203 is close to the temperature rise amount of the internal temperature of the light scanning apparatus 4. However, as understood from the curve CL3, in the case where the rotary polygon mirror 211 is rotated in the state where the light beam is not emitted, the temperature rise amount of the detected temperature of the thermistor 216 on the drive circuit board 203 is small. Meanwhile, as represented by the curve CL1, the temperature rise amount of the internal temperature of the light scanning apparatus 4 is large. Consequently, the difference between the curves CL3 and CL1 becomes large with the lapse of the rotation time. For example, rotation of the rotary polygon mirror 211 for 60 seconds in the state without light beam emission causes a deviation of 1° C. between the temperature rise amount of 1.2° C. of the internal temperature of the light scanning apparatus 4 and the temperature rise amount of 0.2° C. of the detected temperature of the thermistor 216 on the drive circuit board 203. The deviation of 1° C. causes a color misregistration amount of about 13 μm.

In this embodiment, in a case where time T1 during which the rotary polygon mirror 211 is rotated in the state without light beam emission exceeds a predetermined time P1, the light beam emission is started and the rotary polygon mirror 211 is rotated in the state with light beam emission. In this embodiment, the color misregistration correction in the sub-scanning direction is performed in unit of one pixel (about 10.58 μm) at the resolution of 2400 dpi. Consequently, a color misregistration amount less than one pixel (about 10.58 μm) cannot be corrected. In a case where the rotary polygon mirror 211 is rotated for 30 seconds in the state without light beam emission, the color misregistration amount is about 6.5 μm in this embodiment. The color misregistration amount of about 6.5 μm is less than one pixel (about 10.58 μm). Consequently, this amount is a value where the color misregistration can be permitted. In this embodiment, in the case where time T1 during which the rotary polygon mirror 211 is rotated in the state without light beam emission exceeds the predetermined time P1 of 30 seconds, the light beam emission is started. Consequently, the color misregistration can be prevented while reducing the printing time.

(Print Operation)

Figure 13:
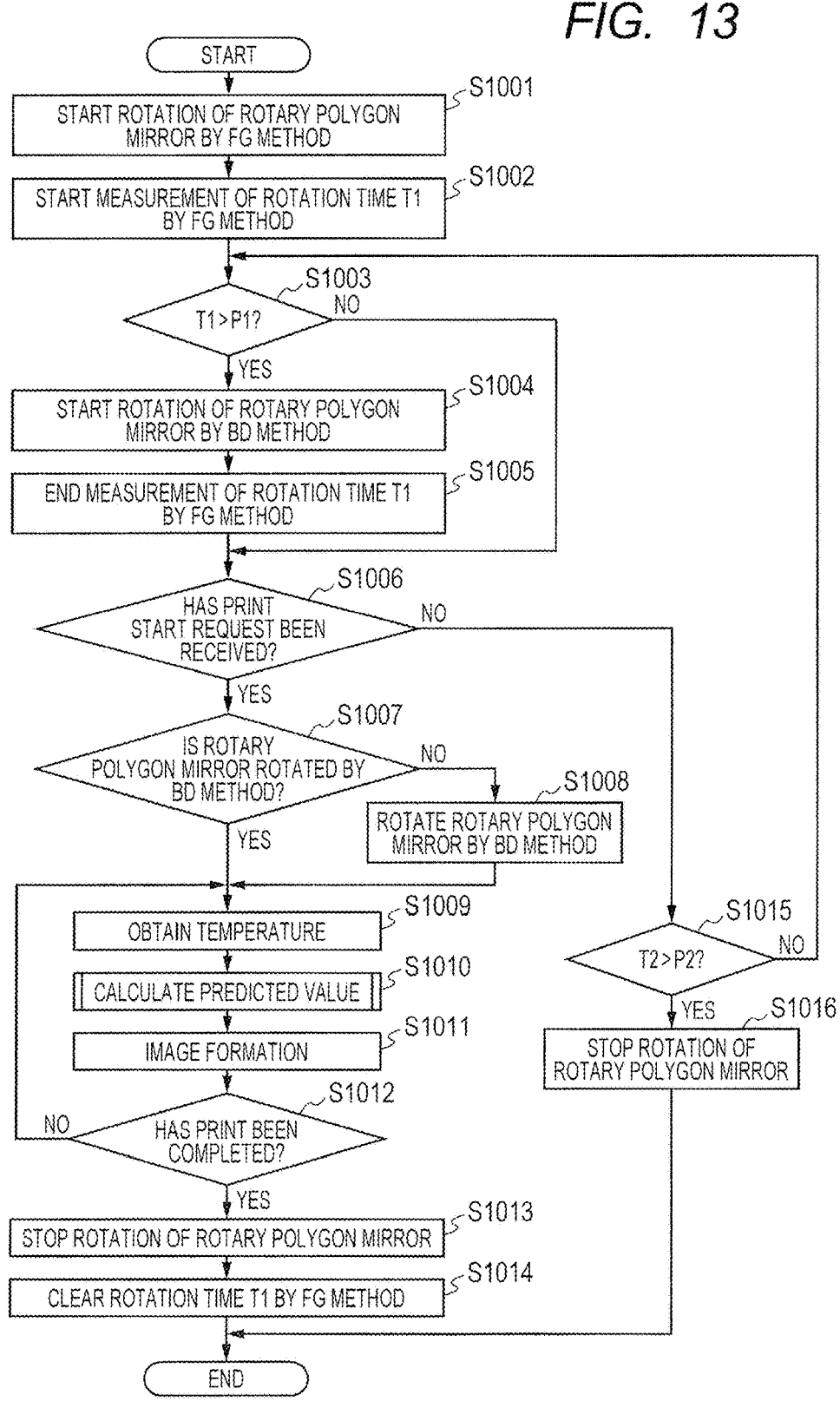
FIG. 13 is a flowchart illustrating a print operation executed by a CPU.

Next, referring to FIG. 13, the print operation according to this embodiment will be described. FIG. 13 is a flowchart illustrating the print operation executed by the CPU 301. The CPU 301 executes the print operation, based on the program stored in the ROM 302. In this embodiment, when it is determined that a predetermined condition is satisfied in a state where the rotary polygon mirror 211 is stopped according to the flying start function described above, the rotation of the rotary polygon mirror 211 is started. In the image forming apparatus 10 of this embodiment, for example, when the original is mounted on the image reading portion 100 or when the image forming condition for forming an image on the sheet S is set through the operating portion 20, the print preparation request (image formation preparation signal) is output to the CPU 301. Upon receipt of the print preparation request for starting printing preparation (first timing), the CPU 301 starts the rotation of the rotary polygon mirror 211 by the FG method (S1001). The FG method controls the rotation speed of the drive motor 700 in a first state where the light source 250 emits no light beam, based on the FG signal of the FG 215. When the rotation of the rotary polygon mirror 211 according to the FG method becomes stable at a predetermined rotation speed (target rotation speed), the CPU 301 starts measurement of the rotation time T1 by the FG method (S1002).

Here, in a case where the rotation of the rotary polygon mirror 211 is stopped without receipt of the print start request when the print preparation request last time is received, the rotation time T1 by the FG method measured in S1003 becomes an accumulated value also including the rotation time T1(PREV) according to the FG method last time. The CPU 301 determines whether the rotation time T1 by the FG method exceeds the predetermined time P1 (S1003). In this embodiment, the predetermined time P1 is set to 30 seconds. However, the predetermined time P1 is not limited to 30 seconds, but may be set to any time period, such as 25 or 35 seconds. If the rotation time T1 by the FG method exceeds the predetermined time P1 (second timing) (YES in S1003), the CPU 301 causes the light source 250 to emit the light beam and starts the rotation of the rotary polygon mirror 211 by the BD method (S1004). The BD method controls the rotation speed of the drive motor 700 in a second state where the light source 250 emits the light beam, based on the BD signal of the BD 212. The CPU 301 ends the measurement of the rotation time T1 by the FG method (S1005). The processing proceeds to S1006. On the other hand, if the rotation time T1 by the FG method does not exceed the predetermined time P1 (NO in S1003), the CPU 301 maintains the state where the rotary polygon mirror 211 stably rotates by the FG method. The processing proceeds to S1006.

The CPU 301 determines whether the print start request (image formation start signal) for starting printing has been received or not (S1006). When the print start is set through the operating portion 20, the print start request is output from the operating portion 20 to the CPU 301. If the print start request has been received (YES in S1006), the CPU 301 determines whether or not the rotary polygon mirror 211 rotates by the BD method based on the BD signal from the BD 212 that detects the light beam emitted from the light source 250 (S1007). When the rotary polygon mirror 211 is rotated by the BD method (YES in S1007), the processing proceeds to S1009. On the other hand, when the rotary polygon mirror 211 is not rotated by the BD method (NO in S1007), the CPU 301 causes the light source 250 to emit the light beam and rotates the rotary polygon mirror 211 by the BD method based on the BD signal from the BD 212 (S1008). The processing proceeds to S1009. The CPU 301 controls the rotation speed of the drive motor 700 so that the period of the BD signal can reach the period proportional to the target rotation speed of the rotary polygon mirror 211.

When the period of the BD signal reaches the target period, the CPU 301 obtains the detected temperature Tscn (NOW) of the thermistor 216 on the drive circuit board 203 outside of the light scanning apparatus 4 and the detected temperature Tdev(NOW) of the thermistor 8 in the developing device 5 (S1009). The CPU 301 calculates the predicted value X(NOW) of the color misregistration amount using the thus obtained detected temperatures Tscn(NOW) and Tdev(NOW) for the expression described above (S1010). The CPU 301 performs the color misregistration correction using the predicted value X(NOW) and the actual measurement value and starts image formation (S1011). The CPU 301 determines whether the printing has been completed or not (S1012). If the printing has not been completed yet (NO in S1012), the CPU 301 repeats the processes S1009 to S1012 until completion of the printing. If the printing has been completed (YES in S1012), the CPU 301 stops the rotation of the rotary polygon mirror 211 (S1013). The CPU 301 clears the rotation time T1 by the FG method (S1014).

Figure 14:
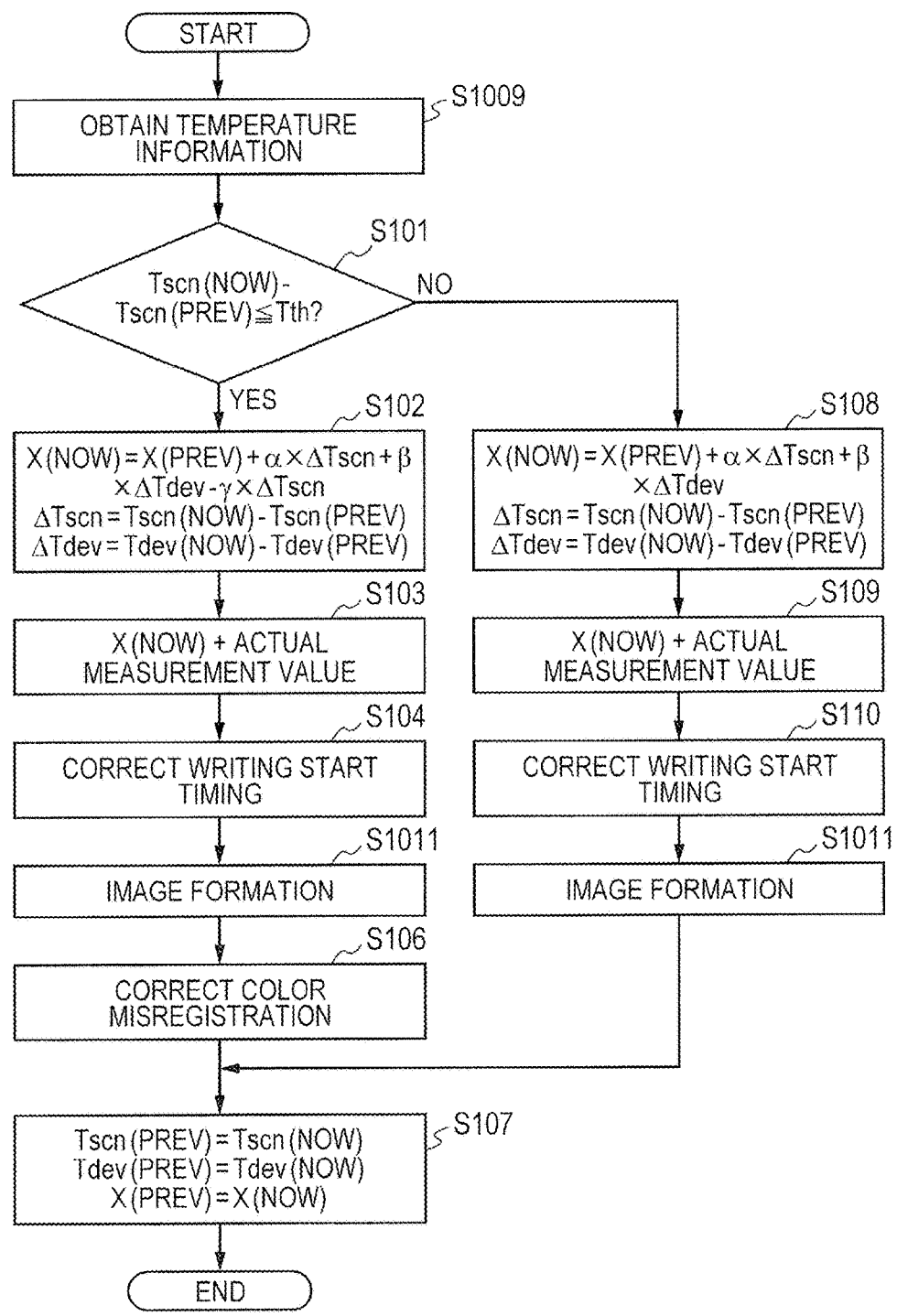
FIG. 14 is a flowchart illustrating a control operation for calculating a predicted value of the color misregistration amount.

Here, the calculation of the predicted value X(NOW) from S1009 to S1012 will be described in further detail with reference to FIG. 14. FIG. 14 is a flowchart illustrating a control operation for calculating the predicted value X(NOW) of the color misregistration amount. The CPU 301 obtains the detected temperature Tscn(NOW) of the thermistor 216 on the drive circuit board 203 outside of the light scanning apparatus 4 and the detected temperature Tdev (NOW) of the thermistor 8 in the developing device 5 (S1009). The CPU 301 determines whether or not the detected temperature Tscn(NOW) of the thermistor 216 is reduced from the detected temperature Tscn(PREV) last time by the predetermined temperature Tth or more (S101). In step S101, the CPU 301 determines whether the detected temperature Tscn(NOW) of the thermistor 216 is lower than the last detected temperature Tscn(PREV) of the thermistor 216 and the difference between the detected temperatures is at least a predetermined temperature Tth.

In a case where the detected temperature Tscn(NOW) of the thermistor 216 is lower than the last detected temperature Tscn(PREV) and the difference between the detected temperatures is at least a predetermined value, the color misregistration determining portion 506 calculates the predicted value X(NOW) based on the following expression (S102). This case is a case where the value obtained by subtracting the detected temperature Tscn(PREV) of the thermistor 216 last time from the detected temperature Tscn(NOW) of the thermistor 216 is the predetermined temperature Tth or less (YES in S101).

$$X(NOW) = X(PREV) + \alpha \times \Delta Tscn + \beta \times \Delta Tdev - \gamma \times \Delta Tscn$$

Here, $$\Delta Tscn = Tscn(NOW) - Tscn(PREV)$$

$$\Delta Tdev = Tdev(NOW) - Tdev(PREV)$$

The color misregistration determining portion 506 adds the actual measurement value of the color misregistration amount preliminarily stored in the RAM 303 to the predicted value X(NOW) of the color misregistration amount (S103), and determines the color misregistration amounts ΔH and ΔV serving as correction values. The timing correction portion 507 corrects the image writing start timing, based on the color misregistration amounts ΔH and ΔV determined in step S103 (S104). The CPU 301 causes the image forming portion 1 to form an image (S1011). The CPU 301 updates the actual measurement value of the color misregistration correction (S106). In step S106, the CPU 301 causes the image forming portion 1 to form the pattern image, causes the pattern sensor 45 to detect the pattern image, and updates the actual measurement value of the color misregistration amount for each color.

When the pattern image is formed and the actual measurement value of the color misregistration amount is updated, the CPU 301 stores, in the RAM 303, the temperature information obtained in step S1009 and the predicted value X(NOW) of the color misregistration amount this time (S107). The CPU 301 ends the execution of the image forming operation. As for the temperature information stored in the RAM 303 in step S107, the detected temperature Tscn(NOW) this time is stored as Tscn(PREV), and the detected temperature Tdev(NOW) this time is stored as Tdev(PREV). In step S107, the predicted value X(NOW) of the color misregistration amount this time is stored as the predicted value X(PREV), in the RAM 303.

In step S101, in a case where the detected temperature Tscn(NOW) is at least the last detected temperature Tscn(PREV) or a case where the difference between the detected temperatures is less than the predetermined temperature, the color misregistration determining portion 506 calculates the predicted value X(NOW) based on the following expression (S108). This case is a case where the value obtained by subtracting the detected temperature Tscn(PREV) of the thermistor 216 last time from the detected temperature Tscn(NOW) of the thermistor 216 is larger than the predetermined temperature Tth (NO in S101).

$$X(NOW)=X(PREV)+\alpha \times \Delta Tscn + \beta \times \Delta Tdev$$

Here, $$\Delta Tscn = Tscn(NOW) - Tscn(PREV)$$

$$\Delta Tdev = Tdev(NOW) - Tdev(PREV)$$

The color misregistration determining portion 506 adds the actual measurement value of the color misregistration amount stored in the RAM 303 to the predicted value X(NOW) of the color misregistration amount (S109), and determines the color misregistration amounts ΔH and ΔV serving as correction values. The timing correction portion 507 corrects the image writing start timing, based on the color misregistration amounts ΔH and ΔV determined in step S109 (S110). The CPU 301 causes the image forming portion 1 to form an image (S1011). The processing proceeds to S107. The CPU 301 ends the execution of the image forming operation.

If the print start request has not been received in S1006 (NO in S1006), the CPU 301 determines whether or not the elapsed time T2 from start of determination whether or not the print start request is received exceeds the predetermined time P2 (S1015). In this embodiment, the predetermined time P2 is set to 15 seconds in consideration of time from print setting by the user to print start. However, the predetermined time P2 is not limited to 15 seconds. Alternatively, the time P2 may be set to any time period, such as 10 or 20 seconds. If the elapsed time T2 exceeds the predetermined time P2 (YES in S1015), the CPU 301 stops the rotation of the rotary polygon mirror 211 (S1016). In this case, the CPU 301 does not clear the measured rotation time T1 by the FG method. The measured rotation time T1 by the FG method is accumulated in the rotation time T1 during the next rotation of the rotary polygon mirror 211 by the FG method. When the measurement of the rotation time T1 by the FG method has not been ended yet, the CPU 301 may end the measurement of the rotation time T1 by the FG method. The CPU 301 may store the measured rotation time T1 by the FG method in the RAM 303. If the elapsed time T2 does not exceed the predetermined time P2 (NO in S1015), the processing returned to S1003. Until the print start request is received (YES in S1006) or until the elapsed time T2 exceeds the predetermined time P2 (YES in S1015), the CPU 301 repeats the processes from S1003 to S1006 and S1015.

Figure 15:
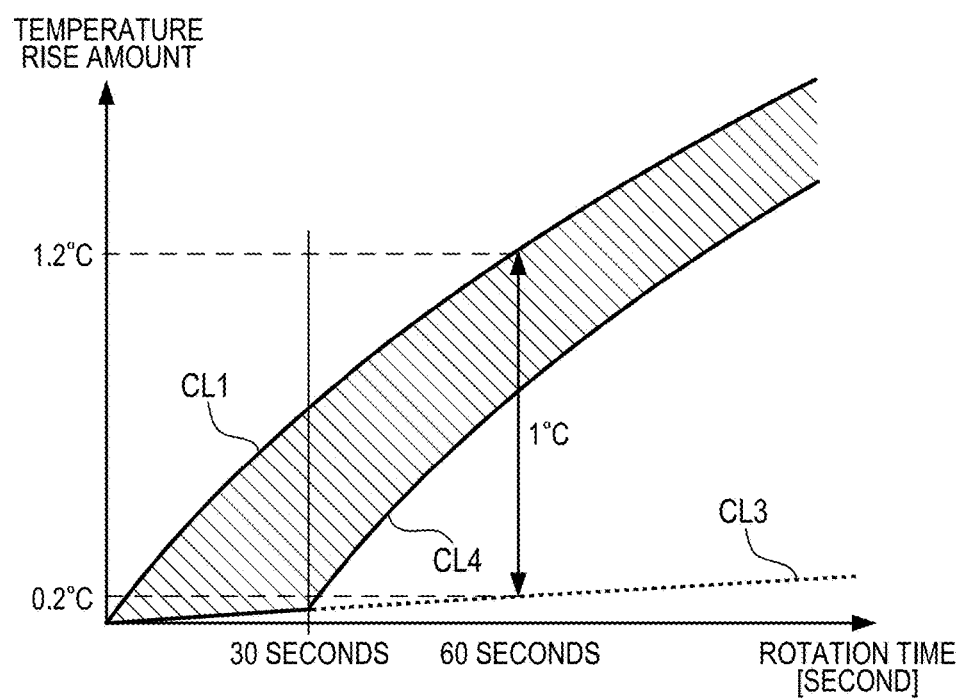
FIG. 15 is a diagram illustrating the deviation between the temperature rise amount of the temperature detected by the thermistor and the temperature rise amount of the internal temperature of the light scanning apparatus.

In the embodiment, the detected temperature that is detected by the thermistor 216 provided on or adjacent to the drive circuit board 203 outside of the light scanning apparatus 4 will be described. FIG. 15 is a diagram illustrating the deviation between the temperature rise amount of the temperature detected by the thermistor 216 and the temperature rise amount of the internal temperature of the light scanning apparatus 4. A curve CL4 indicates the temperature rise amount of the detected temperature of the thermistor 216 on the drive circuit board 203 in a case where the rotation of the rotary polygon mirror 211 by the BD method is started when the rotation time T1 by the FG method exceeds 30 seconds. The curve CL4 increases along the curve CL3 according to the FG method in the rotation time from 0 to 30 seconds, and subsequently increases in temperature rise amount according to the BD method. A hatched part between the curves CL1 and CL4 indicates the deviation between the temperature rise amount of the temperature detected by the thermistor 216 and the temperature rise amount of the internal temperature of the light scanning apparatus 4. According to this embodiment, the rotation control method of the rotary polygon mirror 211 is switched from the FG method to the BD method within 30 seconds, which is the predetermined time P1. Consequently, the temperature rise amount of the detected temperature of the thermistor 216 is included in the hatched part in FIG. 15. According to the conventional art, the deviation between the temperature rise amount of the internal temperature of the light scanning apparatus 4 and the temperature rise amount of the detected temperature of the thermistor 216 on the drive circuit board 203 is indicated between the curves CL1 and CL3. Consequently, in comparison with the conventional art, this embodiment can reduce the deviation between the temperature rise amount of the internal temperature of the light scanning apparatus 4 and the temperature rise amount of the detected temperature of the thermistor 216 on the drive circuit board 203.

In this embodiment, in a case where the rotation of the rotary polygon mirror 211 is stopped without receipt of the print start request after receipt of the print preparation request (S1016), the rotation time T1 by the FG method is not cleared and accumulated in the next rotation time T1 by the FG method. If the thus accumulated rotation time T1 exceeds the predetermined time P1 (YES in S1003), the light source 250 emits the light beam and the rotary polygon mirror 211 is rotated by the BD method. However, if the rotation of the rotary polygon mirror 211 is stopped without receipt of the print start request after receipt of the print preparation request (S1016), the subsequent stop state being left for a long time causes the internal temperature of the light scanning apparatus 4 to be substantially identical to the detected temperature of the thermistor 216 on the drive circuit board 203. As described above, in the case where the stop state is left for a long time, the measured rotation time T1 by the FG method may be cleared. In this embodiment, the ratio between the rotation time T1 of the rotary polygon mirror 211 by the FG method and the elapsed time T3 after stop of the rotation of the rotary polygon mirror 211 is T1:T3=1:3, and the internal temperature of the light scanning apparatus 4 returns to the condition substantially identical to that of the detected temperature of the thermistor 216 on the drive circuit board 203. That is, in a case where the rotary polygon mirror 211 is rotated for 15 seconds without light beam emission and subsequently the rotary polygon mirror 211 is stopped for 45 seconds, the internal temperature of the light scanning apparatus 4 returns to the condition substantially identical to that of the detected temperature of the thermistor 216 on the drive circuit board 203.

This embodiment can reduce the deviation between the temperature rise amount of the internal temperature of the light scanning apparatus 4 and the temperature rise amount of the detected temperature of the thermistor 216 on the drive circuit board 203. Consequently, the accuracy of the color misregistration correction can be improved in comparison with that according to the conventional art.

Embodiment 2

Embodiment 2 will hereinafter be described. In Embodiment 2, structures analogous to those of Embodiment 1 are assigned analogous reference symbols. The description thereof is omitted. In Embodiment 2, the image forming apparatus 10, the light scanning apparatus 4 and the control system 300 are analogous to those of Embodiment 1. Consequently, the description thereof is omitted. In Embodiment 1, if the rotation time T1 during which the rotary polygon mirror 211 is rotated by the FG method where the light beam is not emitted exceeds the predetermined time P1 (YES in S1003), the rotary polygon mirror 211 is rotated by the BD method (S1004). In Embodiment 2, when the color misregistration amount caused by the difference between the temperature rise amount ΔTscn1 of the internal temperature of the light scanning apparatus 4 and the temperature rise amount ΔTscn2 of the thermistor 216 on the drive circuit board 203 outside of the light scanning apparatus 4 reaches the correctable color misregistration amount, the rotary polygon mirror 211 is rotated by the BD method.

As described with reference to FIG. 12, in this embodiment, when the difference between the temperature rise amount ΔTscn1 of the internal temperature of the light scanning apparatus 4 and the temperature rise amount ΔTscn2 of the thermistor 216 on the drive circuit board 203 outside of the light scanning apparatus 4 is 1° C., a color misregistration amount of about 13 μm occurs. In this embodiment, the color misregistration correction in the sub-scanning direction is performed in unit of one pixel (about 10.58 μm) at the resolution of 2400 dpi. Consequently, the correctable color misregistration amount is about 10.58 μm. When the difference between the temperature rise amount ΔTscn1 of the internal temperature of the light scanning apparatus 4 and the temperature rise amount ΔTscn2 of the thermistor 216 on the drive circuit board 203 outside of the light scanning apparatus 4 becomes about 0.814° C. or more, the predicted color misregistration amount becomes larger than the correctable color misregistration amount. In this embodiment, when the difference T3 between the temperature rise amount ΔTscn1 of the internal temperature of the light scanning apparatus 4 and the temperature rise amount ΔTscn2 of the thermistor 216 on the drive circuit board 203 outside of the light scanning apparatus 4 is larger than a predetermined value P3, the rotary polygon mirror 211 is rotated by the BD method. The relationship (the curve CL1 in FIG. 12) between the rotation time T1 of the rotary polygon mirror 211 and the temperature rise amount ΔTscn1 of the internal temperature of the light scanning apparatus 4 is preliminarily measured, and is stored, as a search table, in the ROM (storage unit) 302.

(Print Operation)

Figure 16:
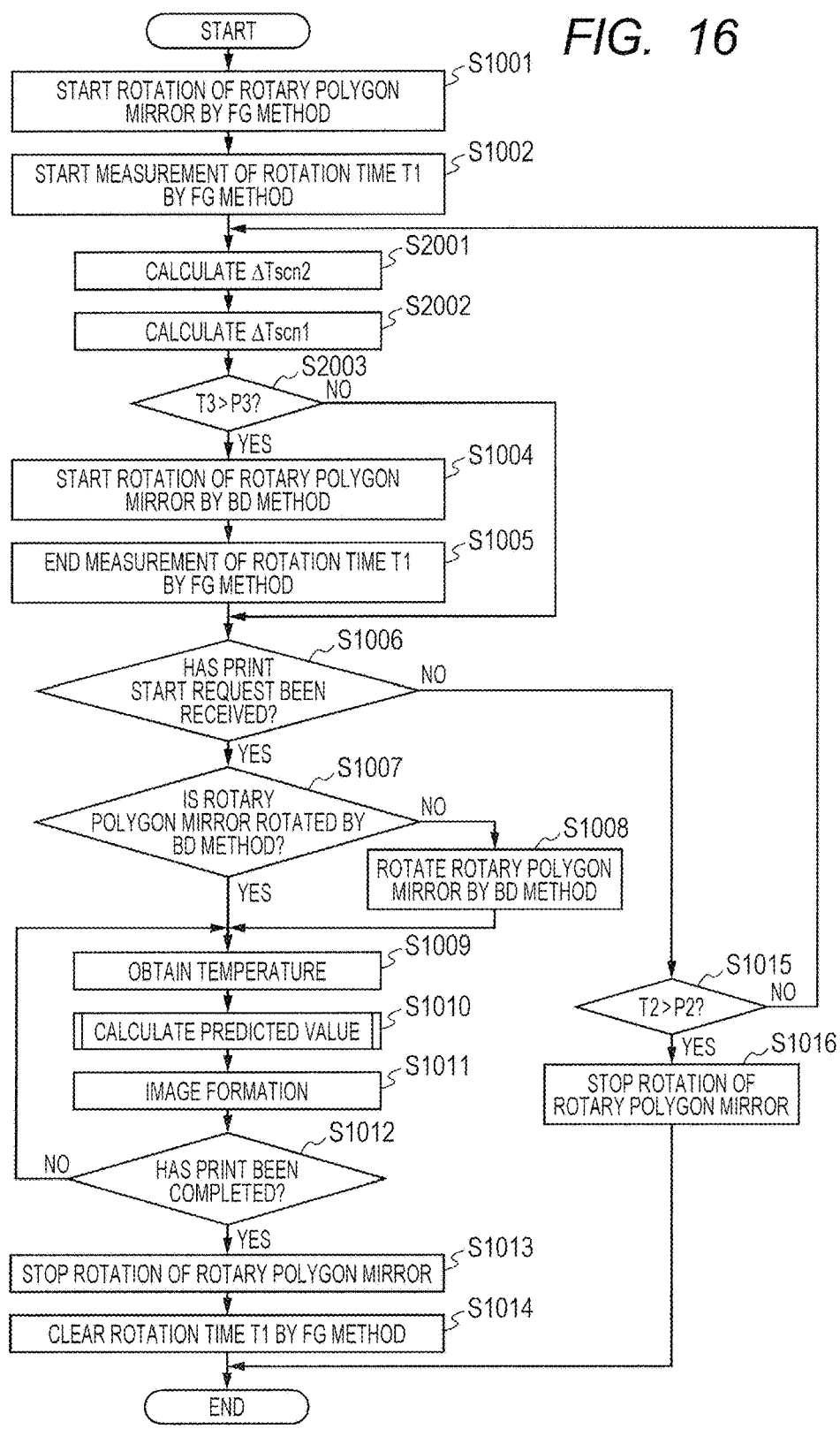
FIG. 16 is a flowchart illustrating a print operation executed by a CPU in Embodiment 2.

Next, referring to FIG. 16, the print operation according to Embodiment 2 will be described. FIG. 16 is a flowchart illustrating the print operation executed by the CPU 301 in Embodiment 2. The CPU 301 executes the print operation, based on the program stored in the ROM 302. Steps S1001, S1002 and S1004 to S1016 in FIG. 16 are analogous to the steps S1001, S1002 and S1004 to S1016 illustrated in FIG. 13. Consequently, the description thereof is omitted. Embodiment 2 executes S2001 to S2003 instead of S1003 in Embodiment 1. Points different from those in Embodiment 1 will hereinafter be described.

When measurement of the rotation time T1 by the FG method is started (S1002), the CPU 301 detects the temperature through the thermistor 216 on the drive circuit board 203. The CPU 301 calculates the temperature rise amount ΔTscn2 that is the difference between the detected temperature at the start time point (T1=0) of measurement of the rotation time T1 and the detected temperature at the time point of the rotation time T1 (S2001). The CPU 301 calculates the temperature rise amount ΔTscn1 of the internal temperature of the light scanning apparatus 4 at the time point of the rotation time T1 based on the search table (curve CL1 in FIG. 12) stored in the ROM 302 (S2002). The CPU 301 calculates the difference T3 between the temperature rise amount ΔTscn1 of the internal temperature of the light scanning apparatus 4 and the temperature rise amount ΔTscn2 of the thermistor 216 on the drive circuit board 203 outside of the light scanning apparatus 4. The CPU 301 determines whether the difference T3 is larger than the predetermined value P3 (about 0.814° C. in this embodiment) or not (S2003). If the difference T3 is larger than the predetermined value P3 (second timing) (YES in S2003), the CPU 301 causes the light source 250 to emit the light beam and starts the rotation of the rotary polygon mirror 211 by the BD method based on the BD signal from the BD 212 (S1004). On the other hand, if the difference T3 is not larger than the predetermined value P3 (NO in S2003), the CPU 301 maintains the state where the rotary polygon mirror 211 stably rotates by the FG method. The processing proceeds to S1006. The steps thereafter are analogous to those in Embodiment 1. Consequently, the description thereof is omitted.

According to this embodiment, if the predicted color misregistration amount becomes larger than the correctable color misregistration amount after rotation of the rotary polygon mirror 211 by the FG method, the FG method can be changed to the BD method and the rotary polygon mirror 211 can be rotated. Consequently, this embodiment can reduce the deviation between the temperature rise amount of the internal temperature of the light scanning apparatus 4 and the temperature rise amount of the detected temperature of the thermistor 216 on the drive circuit board 203 can be reduced. Consequently, the accuracy of the color misregistration correction can be improved in comparison with the accuracy according to the conventional art.

Embodiment 3

Embodiment 3 will hereinafter be described. In Embodiment 3, structures analogous to those of Embodiments 1 and 2 are assigned analogous reference symbols. The description thereof is omitted. In Embodiment 3, the image forming apparatus 10, the light scanning apparatus 4 and the control system 300 are analogous to those of Embodiment 1. Consequently, the description thereof is omitted. Embodiment 3 is a combination of Embodiments 1 and 2. In Embodiment 3, if the rotation time T1 during which the rotary polygon mirror 211 is rotated by the FG method exceeds the predetermined time P1, or if the difference T3 (=ΔTscn1−ΔTscn2) between the temperature rise amounts is larger than the predetermined value P3, the rotary polygon mirror 211 is rotated by the BD method.

(Print Operation)

Figure 17:
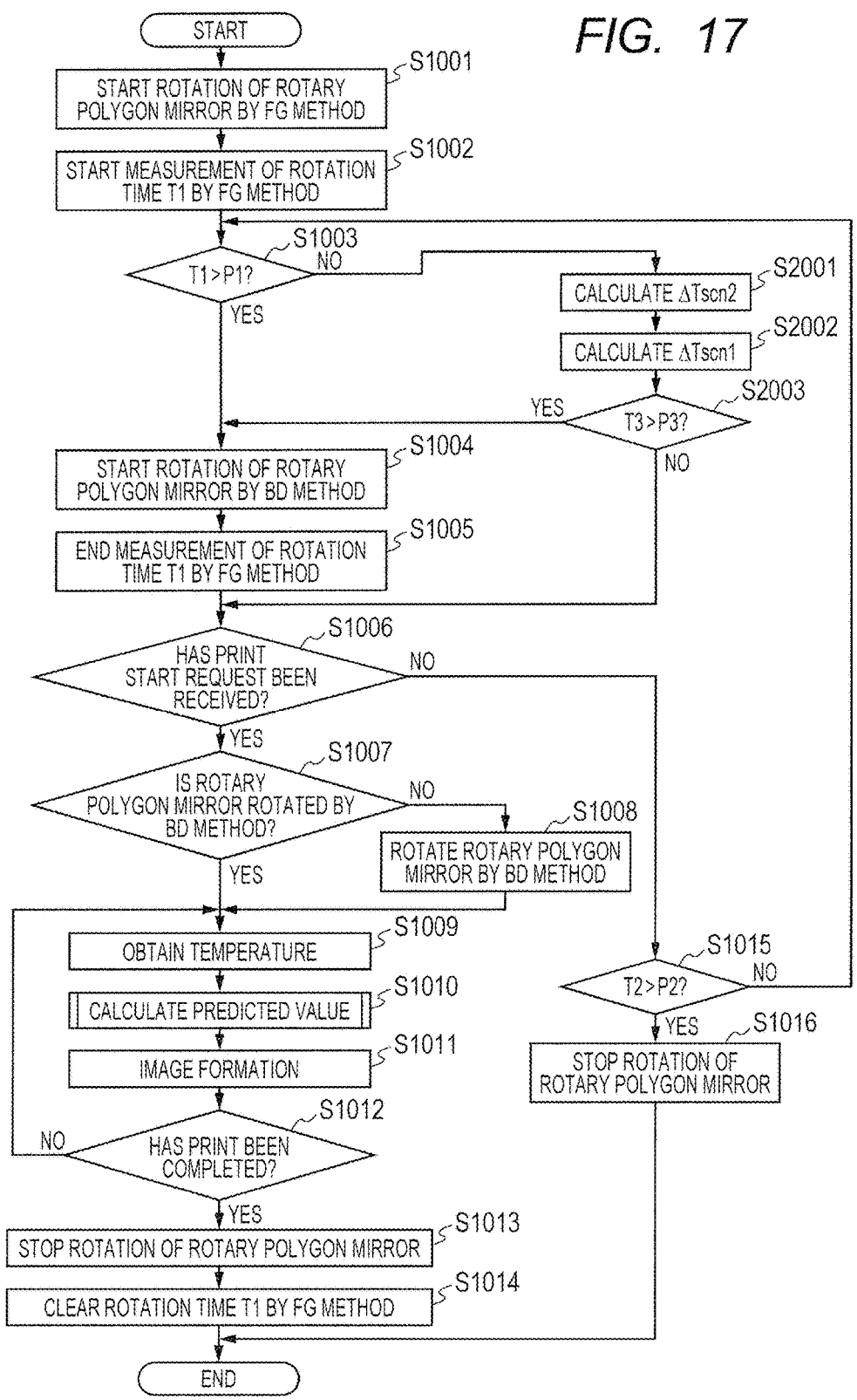
FIG. 17 is a flowchart illustrating a print operation executed by a CPU in Embodiment 3.

Next, referring to FIG. 17, the print operation according to Embodiment 3 will be described. FIG. 17 is a flowchart illustrating the print operation executed by the CPU 301 in Embodiment 3. The CPU 301 executes the print operation, based on the program stored in the ROM 302. Steps S1001, S1002 and S1004 to S1016 in FIG. 17 are analogous to steps S1001, S1002 and S1004 to S1016 of Embodiment 1 illustrated in FIG. 13. Consequently, the description thereof is omitted. Embodiment 3 is achieved by adding steps S2001 to S2003 in Embodiment 2 to the flowchart in Embodiment 1. Points different from those in Embodiment 1 will hereinafter be described.

When the rotation time T1 by the FG method is started (S1002), the CPU 301 determines whether the rotation time T1 by the FG method exceeds the predetermined time P1 or not (S1003). If the rotation time T1 by the FG method exceeds the predetermined time P1 (YES in S1003), the CPU 301 causes the light source 250 to emit the light beam and starts the rotation of the rotary polygon mirror 211 by the BD method based on the BD signal from the BD 212 (S1004). On the other hand, when the rotation time T1 by the FG method does not exceed the predetermined time P1 (NO in S1003), the CPU 301 detects the temperature by the thermistor 216 on the drive circuit board 203. The CPU 301 calculates the temperature rise amount ΔTscn2 that is the difference between the detected temperature at the start time point (T1=0) of measurement of the rotation time T1 and the detected temperature at the time point of the rotation time T1 (S2001). The CPU 301 calculates the temperature rise amount ΔTscn1 of the internal temperature of the light scanning apparatus 4 at the time point of the rotation time T1 based on the search table (curve CL1 in FIG. 12) stored in the ROM 302 (S2002). The CPU 301 calculates the difference T3 between the temperature rise amount ΔTscn1 of the internal temperature of the light scanning apparatus 4 and the temperature rise amount ΔTscn2 of the thermistor 216 on the drive circuit board 203 outside of the light scanning apparatus 4. The CPU 301 determines whether the difference T3 is larger than the predetermined value P3 or not (S2003). If the difference T3 is larger than the predetermined value P3 (YES in S2003), the CPU 301 causes the light source 250 to emit the light beam and starts the rotation of the rotary polygon mirror 211 by the BD method based on the BD signal from the BD 212 (S1004). On the other hand, if the difference T3 is not larger than the predetermined value P3 (NO in S2003), the CPU 301 maintains the state where the rotary polygon mirror 211 stably rotates by the FG method. The processing proceeds to S1006. The steps thereafter are analogous to those in Embodiment 1. Consequently, the description thereof is omitted.

According to this embodiment, if the predetermined time P1 has elapsed or the predicted color misregistration amount becomes larger than the correctable color misregistration amount after rotation of the rotary polygon mirror 211 by the FG method, the FG method can be changed to the BD method and the rotary polygon mirror 211 can be rotated. Consequently, this embodiment can reduce the deviation between the temperature rise amount of the internal temperature of the light scanning apparatus 4 and the temperature rise amount of the detected temperature of the thermistor 216 on the drive circuit board 203. Consequently, the accuracy of the color misregistration correction can be improved in comparison with the accuracy according to the conventional art.

The image forming apparatuses 10 according to Embodiments 1 to 3 described above can correct color misregistration based on the temperature detected by the thermistor 216 disposed on or adjacent to the drive circuit board 203 provided outside of the housing 200 of the light scanning apparatus 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225040, filed Nov. 18, 2016 which is hereby incorporated by reference herein in its entirety.

What is claimed is:

1. An image forming apparatus, comprising:
a plurality of photosensitive members;
a light scanning apparatus configured to emit light beams scanning on surfaces of the plurality of photosensitive members, respectively, to form electrostatic latent images on the surfaces of the plurality of photosensitive members;
a plurality of developing devices configured to develop the electrostatic latent images formed on the surfaces of the plurality of photosensitive members with developers having respective colors to form a plurality of toner images;
an intermediate transfer member on which the plurality of toner images developed by the plurality of developing devices are transferred;
a pattern detector configured to detect a registration correction pattern included in the toner images transferred onto the intermediate transfer member; and
a controller configured to correct a color misregistration between toner images having respective colors on the intermediate transfer member, based on a detection result of the pattern detector,
wherein the light scanning apparatus includes:
a light source configured to emit the light beams;
a rotary polygon mirror configured to deflect the light beams emitted from the light source so that the light beams scan on the surfaces of the plurality of photosensitive members, respectively, to form the electrostatic latent images;
a motor configured to rotate the rotary polygon mirror;
a first pulse generation unit configured to generate a first pulse in synchronization with a rotation speed of the motor;
a second pulse generation unit configured to generate a second pulse by receiving a light beam deflected by the rotary polygon mirror;

a drive circuit board, to which the light source is attached, configured to drive the light source according to image data;
a housing configured to hold the polygon mirror and the motor therein; and
a temperature detector, disposed on the drive circuit board provided outside of the housing, configured to detect a temperature of the drive circuit board, and
wherein the controller
starts rotation of the rotary polygon mirror when a predetermined condition is satisfied in a state in which the rotary polygon mirror is stopped, and rotates the rotary polygon mirror at a predetermined rotation speed based on the first pulse in a first state in which the light beams are not emitted from the light source,
thereafter, starts emission of the light beams from the light source, switches a rotation control based on the first pulse to a rotation control based on the second pulse, and rotates the rotary polygon mirror at the predetermined rotation speed based on the second pulse in a second state in which the light beams are emitted from the light source, and
thereafter, detects a temperature of the drive circuit board by the temperature detector in response to input of an image formation start signal for starting image formation, and corrects color misregistration using a detected temperature of the temperature detector and the detection result of the pattern detector.

2. The image forming apparatus according to claim 1, wherein in a case where a rotation time during which the rotary polygon mirror is rotated based on the first pulse in the first state has passed a predetermined time period before the image formation start signal is input, the controller starts emission of the light beams from the light source, and rotates the rotary polygon mirror at the predetermined rotation speed based on the second pulse in the second state.

3. The image forming apparatus according to claim 2, wherein in a case where the rotary polygon mirror rotating in the first state is stopped before receipt of the image formation start signal, the rotation time is accumulated in the rotation time of the rotary polygon mirror in a next first state, and
in a case where an accumulated rotation time of the rotary polygon mirror in the next first state has passed the predetermined time period before receipt of the image formation start signal, the controller rotates the rotary polygon mirror at the predetermined rotation speed based on the second pulse in the second state.

4. The image forming apparatus according to claim 1, wherein in a case where a difference between a temperature rise amount of an internal temperature of the housing and a temperature rise amount of the temperature of the drive circuit board detected by the temperature detector has become larger than a predetermined value before receipt of the image formation start signal, the controller starts emission of the light beams from the light source, and rotates the rotary polygon mirror at the predetermined rotation speed based on the second pulse in the second state.

5. The image forming apparatus according to claim 4, further comprising a storage unit configured to store a relationship between a rotation time of the rotary polygon mirror and the temperature rise amount of the internal temperature of the housing.

6. The image forming apparatus according to claim 1, further comprising:
an image reading portion configured to read an image of an original; and
an operating portion through which a user sets an image forming condition,
wherein when the original is mounted on the image reading portion or when the image forming condition is set through the operating portion, the predetermined condition is satisfied and the controller starts the rotation of the rotary polygon mirror.

7. The image forming apparatus according to claim 1, further comprising temperature detectors provided in the plurality of developing devices, respectively,
wherein the controller corrects color misregistration using the temperature detected by the temperature detector disposed on the drive circuit board, and temperatures detected by the temperature detectors provided in the plurality of developing devices, respectively.

8. An image forming apparatus, comprising:
a first image forming portion including: a first photosensitive member; a first light scanning apparatus configured to cause a laser light to scan on the first photosensitive member; and a first developing device configured to develop an electrostatic latent image, formed on the first photosensitive member by scanning of the laser light, using a first toner;
a second image forming portion including: a second photosensitive member; a second light scanning apparatus configured to cause a laser light to scan on the second photosensitive member; and a second developing device configured to develop an electrostatic latent image, formed on the second photosensitive member by scanning the laser light, using a second toner;
a transfer device including an intermediate transfer member to which a first toner image is transferred from the first photosensitive member and a second toner image is transferred from the second photosensitive member, the transfer device being configured to transfer, to a recording medium, the first toner image and the second toner image transferred onto the intermediate transfer member;
a pattern sensor configured to detect color misregistration detection toner patterns formed on the intermediate transfer member by the first image forming portion and the second image forming portion to correct a misregistration between the first toner image and the second toner image to be transferred to the recording medium;
a reading device configured to read an original to generate an image data;
an operating portion configured to receive from a user an input including a reading start input for causing the reading device to start reading the original; and
a controller configured to control the first image forming portion and the second image forming portion,
wherein each of the first light scanning apparatus and the second light scanning apparatus includes: a laser diode configured to emit a laser light; a laser driver configured to supply the laser diode with a drive current; a deflection portion configured to deflect the laser light so that the laser light scans on a corresponding photosensitive member; a drive motor configured to drive the deflection portion; an optical member configured to guide the laser light deflected by the deflection portion to the corresponding photosensitive member; a laser drive circuit board on which the laser diode and the laser driver are mounted; and a housing configured to house the deflection portion, the drive motor and the optical member therein, the laser drive circuit board being attached to an outside of the housing, wherein a temperature sensor configured to detect a temperature is mounted on the laser drive circuit board of the second light scanning apparatus, and wherein the controller starts rotation of the drive motor, which has been stopped, in response to an addition of a predetermined operation other than the reading start input to the operating portion before the reading start input is made to the operating portion, and controls the laser driver of the second light scanning apparatus so as to supply current to the laser diode of the second light scanning apparatus during the rotation of the drive motor before the reading start input is made to the operating portion, and corrects the misregistration between the first toner image and the second toner image to be formed based on the image data, based on a detection result of the misregistration between the first toner image and the second toner image detected by the pattern sensor and a detection result of the temperature sensor after start of supplying the current to the laser diode.

9. The image forming apparatus according to claim 8, wherein the second light scanning apparatus includes: a rotary polygon mirror as the deflection portion; a drive circuit board to which the drive motor is attached; a magnetic sensor mounted on the drive circuit board; and a light receiving portion configured to receive the laser light deflected by the deflection portion to generate a synchronization signal, wherein the drive motor includes a rotor to which the rotary polygon mirror is attached and which rotates the rotary polygon mirror, wherein the magnetic sensor outputs a signal according to a magnetic flux change caused by rotation of a magnet attached to the rotor, and wherein the controller activates the drive motor of the second light scanning apparatus using a period of the magnetic flux change detected by the magnetic sensor of the second light scanning apparatus in response to the addition of the predetermined operation other than the reading start input, and thereafter supplies the current to the laser diode of the second light scanning apparatus to cause the light receiving portion to generate the synchronization signal.

10. The image forming apparatus according to claim 9, wherein in response to generation of the synchronization signal, the controller switches a rotation control of the rotary polygon mirror from a control using the period of the magnetic flux to a control using the period of the synchronization signal.

11. The image forming apparatus according to claim 8, wherein the operating portion comprises a plurality of input keys including a key for starting a reading start, wherein the controller starts the rotation of the drive motor, which has been stopped, in response to an input operation being added to at least one of the plurality of input keys other than the key for starting the reading start.

12. An image forming apparatus, comprising:

a first image forming portion including: a first photosensitive member; a first light scanning apparatus configured to cause a laser light to scan on the first photosensitive member; and a first developing device configured to develop an electrostatic latent image, formed on the first photosensitive member by scanning of the laser light, using a first toner;

a second image forming portion including: a second photosensitive member; a second light scanning apparatus configured to cause a laser light to scan on the second photosensitive member; and a second developing device configured to develop an electrostatic latent image, formed on the second photosensitive member by scanning of the laser light, using a second toner;

a transfer device including an intermediate transfer member to which a first toner image is transferred from the first photosensitive member and a second toner image is transferred from the second photosensitive member, the transfer device being configured to transfer, to a recording medium, the first toner image and the second toner image transferred onto the intermediate transfer member;

a pattern sensor configured to detect color misregistration detection toner patterns formed on the intermediate transfer member by the first image forming portion and the second image forming portion to correct a misregistration between the first toner image and the second toner image to be transferred to the recording medium;

a reading device configured to read an original to generate an image data;

an operating portion configured to receive from a user an input including a reading start input for causing the reading device to start reading the original; and a controller configured to control the first image forming portion and the second image forming portion, wherein each of the first light scanning apparatus and the second light scanning apparatus includes: a laser diode configured to emit a laser light; a laser driver configured to supply the laser diode with a drive current; a deflection portion configured to deflect the laser light so that the laser light scans on a corresponding photosensitive member; a drive motor configured to drive the deflection portion; an optical member configured to guide the laser light deflected by the deflection portion to the corresponding photosensitive member; a laser drive circuit board on which the laser diode and the laser driver are mounted; and a housing configured to house the deflection portion, the drive motor and the optical member therein, the laser drive circuit board being attached to an outside of the housing, wherein a temperature sensor configured to detect a temperature is mounted on the laser drive circuit board of the second light scanning apparatus, and wherein the controller starts rotation of the drive motor, which has been stopped, in response to a predetermined operation for setting the original being added to the reading device before the reading start input is made to the operating portion, and controls the laser driver of the second light scanning apparatus so as to supply current to the laser diode of the second light scanning apparatus during the rotation of the drive motor before the reading start input is made to the operating portion, and corrects the misregistration between the first toner image and the second toner image to be formed based on the image data, based on a detection result of the misregistration between the first toner image and the second toner image detected by the pattern sensor and a detection result of the temperature sensor after start of supplying the current to the laser diode.

13. The image forming apparatus according to claim 12, wherein the second light scanning apparatus includes: a rotary polygon mirror as the deflection portion; a drive circuit board to which the drive motor is attached; a magnetic sensor mounted on the drive circuit board; and a light receiving portion configured to receive the laser light deflected by the deflection portion to generate a synchronization signal, wherein the drive motor includes a rotor to which the rotary polygon mirror is attached and which rotates the rotary polygon mirror, wherein the magnetic sensor outputs a signal according to a magnetic flux change caused by rotation of a magnet attached to the rotor, and wherein the controller activates the drive motor of the second light scanning apparatus using a period of the magnetic flux change detected by the magnetic sensor of the second light scanning apparatus in response to the placing of the original on the reading device, and thereafter supplies the current to the laser diode of the second light scanning apparatus to cause the light receiving portion to generate the synchronization signal.

14. The image forming apparatus according to claim 13, wherein in response to generation of the synchronization signal, the controller switches a rotation control of the rotary polygon mirror from a control using the period of the magnetic flux to a control using the period of the synchronization signal.

* * * * *